(12) United States Patent
Prosnitz

(10) Patent No.: US 10,881,897 B2
(45) Date of Patent: Jan. 5, 2021

(54) CYCLE-TYPE EXERCISE EQUIPMENT CONVERSION APPARATUS AND METHODS OF CONVERTING THEREOF

(71) Applicant: PROSNITZ SOLUTIONS LLC, Skokie, IL (US)

(72) Inventor: Joseph H. Prosnitz, Skokie, IL (US)

(73) Assignee: PROSNITZ SOLUTIONS LLC, Skokie, IL (US)

( * ) Notice: Subject to any disclaimer, the term of this patent is extended or adjusted under 35 U.S.C. 154(b) by 70 days.

(21) Appl. No.: 16/048,770

(22) Filed: Jul. 30, 2018

(65) Prior Publication Data
US 2018/0333607 A1 Nov. 22, 2018

Related U.S. Application Data

(63) Continuation of application No. 15/136,560, filed on Apr. 22, 2016, now Pat. No. 10,039,953.

(60) Provisional application No. 62/153,289, filed on Apr. 27, 2015.

(51) Int. Cl.
| A63B 22/06 | (2006.01) |
| A63B 22/00 | (2006.01) |
| B62M 1/26 | (2013.01) |
| B62K 13/00 | (2006.01) |

(52) U.S. Cl.
CPC ...... *A63B 22/0605* (2013.01); *A63B 22/0007* (2013.01); *A63B 22/0012* (2013.01); *B62K 13/00* (2013.01); *B62M 1/26* (2013.01); *A63B 2022/067* (2013.01); *A63B 2022/0611* (2013.01); *A63B 2022/0647* (2013.01); *A63B 2022/0682* (2013.01)

(58) Field of Classification Search
CPC ............ A63B 22/0605; A63B 22/0007; A63B 22/0012; A63B 2022/0611; A63B 2022/0647; A63B 2022/067; A63B 2022/0682; B62K 13/00; B62M 1/26
USPC .......................................................... 482/61
See application file for complete search history.

(56) References Cited

U.S. PATENT DOCUMENTS

| 558,464 | A | 4/1896 | Bascom |
| 3,259,398 | A | 7/1966 | Hattan |
| 4,026,571 | A | 5/1977 | Vereyken |
| 4,141,587 | A | 2/1979 | Holcomb |
| 4,193,324 | A | 3/1980 | Marc |
| 4,212,480 | A | 7/1980 | Mikina et al. |
| 4,577,879 | A | 3/1986 | Vereyken |
| 4,666,173 | A | 5/1987 | Graham |

(Continued)

FOREIGN PATENT DOCUMENTS

| CA | 2434373 C | 7/2006 |
| CN | 202557720 U | 11/2012 |

(Continued)

OTHER PUBLICATIONS

International Search Report and Written Opinion of the ISA/US issued in corresponding application PCT/US2016/029007, dated Jul. 29, 2016, 11 pages.

*Primary Examiner* — Andrew S Lo
(74) *Attorney, Agent, or Firm* — Faegre Drinker Biddle & Reath LLP

(57) ABSTRACT

An apparatus for converting a cycle-type exercise machine into another type of exercise machine includes a stationary frame structure that attaches to a frame of the cycle-type exercise machine, a pair of swing arms pivotally coupled with the stationary frame structure, and a pair of coupler bars pivotally coupled with the pair of swing arms on one end and rotationally attached to a crank bar of the cycle-type exercise machine on an opposite end.

7 Claims, 15 Drawing Sheets

(56) References Cited

U.S. PATENT DOCUMENTS

| | | |
|---|---|---|
| 5,419,572 A | 5/1995 | Stiller et al. |
| 5,511,810 A | 4/1996 | Tong |
| 5,540,637 A | 7/1996 | Rodgers, Jr. |
| 5,593,372 A | 1/1997 | Rodgers, Jr. |
| 6,090,013 A | 7/2000 | Eschenbach |
| 6,171,217 B1 | 1/2001 | Cutler |
| 6,398,244 B1 | 6/2002 | Chueh |
| 6,431,301 B1 | 8/2002 | Forbes |
| 6,439,590 B1 | 8/2002 | Liang |
| 6,557,657 B2 | 5/2003 | Persson |
| 6,572,128 B2 | 6/2003 | Graf |
| 6,648,353 B1 | 11/2003 | Cabal |
| 6,659,486 B2 | 12/2003 | Eschenbach |
| 6,663,127 B2 | 12/2003 | Miller |
| 6,773,022 B2 | 8/2004 | Janssen |
| D526,250 S | 8/2006 | Trumble et al. |
| 7,140,626 B1 | 11/2006 | Keay |
| 7,191,884 B2 | 3/2007 | Kanehisa et al. |
| 7,296,813 B2 | 11/2007 | Montague et al. |
| 7,455,623 B2 | 11/2008 | Wang |
| 7,651,446 B1 | 1/2010 | Eschenbach |
| 7,662,071 B2 | 2/2010 | Ditolla |
| 7,717,446 B2 | 5/2010 | Pate et al. |
| 7,797,841 B2 | 9/2010 | Moreno |
| D633,416 S | 3/2011 | Teal et al. |
| 7,909,348 B2 | 3/2011 | Klieber |
| 7,967,313 B1 | 6/2011 | Eggert |
| 8,029,009 B2 | 10/2011 | Teal et al. |
| 8,061,728 B2 | 11/2011 | Teal et al. |
| 8,123,242 B2 | 2/2012 | Teal et al. |
| 8,128,111 B2 | 3/2012 | Scolari et al. |
| 8,128,536 B2 | 3/2012 | Ditolla |
| 8,162,337 B2 | 4/2012 | Teal et al. |
| 8,181,977 B1 | 5/2012 | Bartlett |
| 8,220,578 B2 | 7/2012 | Kerschgens Long |
| 8,388,004 B2 | 3/2013 | Walter |
| 9,260,156 B2 | 2/2016 | Brewer et al. |
| 2005/0263978 A1 | 12/2005 | Ascher |
| 2006/0019802 A1 | 1/2006 | Caird |
| 2007/0213180 A1 | 9/2007 | Ditolla |
| 2009/0239714 A1 | 9/2009 | Sellers |
| 2012/0178592 A1 | 7/2012 | Chieh et al. |
| 2014/0091551 A1 | 4/2014 | Walter |

FOREIGN PATENT DOCUMENTS

| | | |
|---|---|---|
| EP | 0285858 A2 | 3/1988 |
| EP | 1930235 B1 | 6/2011 |
| KR | 10-2011-0067080 A | 6/2011 |
| WO | 2011/065637 A1 | 6/2011 |
| WO | 2011/157910 A1 | 12/2011 |

CYCLE-TYPE EXERCISE EQUIPMENT CONVERSION APPARATUS AND METHODS OF CONVERTING THEREOF

CROSS-REFERENCE TO RELATED APPLICATION

This patent application is a continuation of U.S. patent application Ser. No. 15/136,560, filed on Apr. 22, 2016, now U.S. Pat. No. 10,039,953, which claims the priority benefit of U.S. Provisional Patent Application No. 62/153,289 entitled "Elliptical Bicycle Conversion Kit Apparatus and Methods of Converting Thereof" and filed on Apr. 27, 2015, the entirety of each being incorporated by reference herein.

BACKGROUND

1. Field

One or more embodiments relate generally to exercise equipment, e.g., bicycles, spin or exercise cycles, rowing machines, stepper machines, and the like, and more particularly, to a cycle-type exercise equipment conversion apparatus and methods of converting thereof.

2. Description of the Related Art

A bicycle is a human powered vehicle that traditionally has, inter alia, a seat and pedals which allow a person to generate rotational motion and drive a wheel to propel the vehicle upon a surface, e.g., a road. While the term "bicycle" refers to such a vehicle that has two wheels, similar vehicles generally referred to as "cycles" herein may have other numbers of wheels. For example, a unicycle has one wheel and a tricycle has three wheels. A cycle has a drive train that converts a human operator's circular motion of pedaling to rotate a circular drive gear into circular motion of a wheel that propels the vehicle in a generally linear direction via contact with a surface, e.g., a road. While standard or conventional bicycles are generally used outdoors, stationary exercise machines that are not properly considered vehicles but are based upon the same principle as the drive train of a bicycle have been developed for indoor use. These may be generally referred to as spin cycles or exercycles. While they do not generally propel the spin cycle in a linear direction upon a surface, they do involve a human operator engaging in a circular motion of pedaling against resistance in order to exercise. In addition, training devices have been designed to incorporate a standard bicycle as a stationary trainer or exercise machine, for both indoor and outdoor use.

A conventional elliptical machine, on the other hand, is traditionally a stationary exercise device that is used to simulate some or all of the aspects of stair climbing, running, and walking, among other exercises, by using a non-circular motion of pedaling by a human operator who typically stands while using the elliptical machine. As such, an elliptical machine exercises different muscle groups and doesn't strain the groin, back, and wrists as much as cycling. With an elliptical-type machine or exerciser, the user can reduce stress on the knees, ankles, hips, joints and other parts of the human body, since these types of machines decrease the strain and stress on the body in compared to cycles that are driven by a circular motion of pedaling.

U.S. Pat. No. 7,717,446 B2, issued on May 18, 2010, to Bryan Pate and Brent Teal, is entitled "Self-Propelled Vehicle Propelled By An Elliptical Drive Train" and is referenced herein. This technology is an outdoor exercise machine that operates in a manner similar to that of a bicycle, except using elliptical pedaling motions rather than a bicycle's circular pedaling motions.

SUMMARY

According to an embodiment, an apparatus for converting a cycle-type exercise machine into another type of exercise machine includes: a stationary frame structure that attaches to a frame of the cycle-type exercise machine; a pair of swing arms having a proximal end and a distal end, the proximal end of each of the pair of swing arms being pivotally coupled with the stationary frame structure to swing relative to the stationary frame structure; and a pair of coupler bars having a first end and a second end, the first end of each of the pair of coupler bars being pivotally coupled with the distal end of a respective one of the pair of swing arms, the second end of each of the pair of coupler bars being configured to rotationally attach to a crank bar of the cycle-type exercise machine.

The apparatus may also include a pair of foot platforms, each of the pair of foot platforms coupled with one of the pair of coupler bars.

The apparatus may also include a pair of pedals, each of the pair of pedals coupled with one of the pair of coupler bars.

The apparatus may also include a pair of handles, each of the pair of handles coupled with one of the pair of coupler bars.

The apparatus may also include a pair of handles, each of the pair of handles coupled with one of the pair of swing arms.

The stationary frame structure may include a seat post insert that inserts into a seat post of a frame of the cycle-type exercise machine.

The stationary frame structure may include a rail mount portion that mounts into a seat rail mount of the cycle-type exercise machine.

The stationary frame structure may include a seat post clamp that clamps onto a seat post insert below a seat of the cycle-type exercise machine.

The stationary frame structure may include a pair of generally vertical bars having an upper end and a lower end, the lower end of each of the pair of generally vertical bars configured to mount onto a rear corner of a diamond frame of the cycle-type exercise machine, and the proximal end of each of the pair of swing arms being pivotally coupled with the upper end of a respective one of the pair of generally vertical bars.

The pair of swing arms may be pivotally coupled with the stationary frame structure in a parallel orientation with one another to pivot about a common axis.

Each of the pair of coupler bars may include a pedal clamp disposed at the second end that clamps onto a pedal attached to the crank bar of the cycle-type machine.

Each of the pair of coupler bars may include a bolt that rotationally attaches the coupler bar to the crank bar of the cycle-type machine.

Each of the pair of coupler bars may include an extension arm that affixes to the crank bar of the cycle-type machine and extends a length of the crank bar, the coupler bar being rotationally attached to the extension arm.

Each of the pair of coupler bars may be extendable to a variable range of lengths.

Each of the pair of swing arms may be extendable to a variable range of lengths.

According to another embodiment, an elliptical-type exercise machine includes: a cycle-type exercise machine having a frame and a circular drive wheel driven by a pair of crank bars; a stationary frame structure that attaches to the frame of the cycle-type exercise machine; a pair of swing arms having a proximal end and a distal end, the proximal end of each of the pair of swing arms being pivotally coupled with the stationary frame structure to swing relative to the stationary frame structure; and a pair of coupler bars having a first end and a second end, the first end of each of the pair of coupler bars being pivotally coupled with the distal end of a respective one of the pair of swing arms, the second end of one of the pair of coupler bars being rotationally attached to the crank bar on one side of the cycle-type exercise machine and the second end of the other of the pair of coupler bars being rotationally attached to the crank bar on an opposite side of the cycle-type exercise machine.

According to another embodiment, a method of converting a cycle-type exercise machine into another type of exercise machine includes: mounting a stationary frame structure onto a frame of the cycle-type exercise machine, the stationary frame structure pivotally coupled with a pair of swing arms having a proximal end and a distal end, the proximal end of each of the pair of swing arms being coupled with the stationary frame structure to swing relative to the stationary frame structure; and attaching each of a pair of coupler bars having a first end and a second end to a crank bar of the cycle-type exercise machine, the first end of each of the pair of coupler bars being pivotally coupled with the distal end of a respective one of the pair of swing arms, the second end of each of the pair of coupler bars being rotationally attached to the crank bar.

The method may further include attaching a pair of foot platforms or pedals to the pair of coupler bars.

The method may further include attaching a pair of handles to the pair of coupler bars at the first end or the pair of swing arms at the distal end.

The method may further include adjusting a length of at least one of the pair of coupler bars or the pair of swing arms.

According to another embodiment, an apparatus to retrofit standard bicycles to elliptical bicycles is provided, where the standard bicycle has a diamond frame, and two crank arms attached to each other through a crank axle. The apparatus includes: a pair of stationary generally vertical bars, each having a proximal end and a distal end; a pair of swing arms that swing around an arm joint axle, each swing arm being adjacent to a respective one of the generally vertical bars, each of the swing arms having a proximal end and a distal end; a pair of foot platforms hingedly connected to the crank arms, rotating around the crank axle; a pair of generally horizontal bars that are an intermediary between the swing arms and the foot platforms, each having a proximal end and distal end; and a rear triangle mount that is an intermediary to hingedly connect the generally vertical bars to the diamond frame of the bicycle. The generally vertical bars are hingedly connected to the swing arms at an arm joint, and the swing arms are hingedly connected to the generally horizontal bars.

A crossbar beam may be connected through a crossbar joint connection from the proximal vertical bar to the distal vertical bar.

An extension member may be hingedly connected between the distal generally vertical bar and the distal swing arm.

The rear triangle mount may have two plates that are formed to fasten onto the rear stays of the back triangle of the diamond bicycle frame and may be connected using threaded bolts.

The bottoms of the foot platforms may be secured by at least one bracket.

The foot platforms may be connected to the crank arms through a pedal axle connector.

The substituted foot platforms may be attached rotationally to the horizontal bars.

According to another embodiment, a method to convert a standard bicycle, which has a diamond frame and two crank arms attached to each other through a crank axle, into an elliptical bicycle includes: retrofitting the standard bicycle by removing the seat and conventional bicycle pedals; attaching foot platforms; attaching generally vertical bars with a rear triangle mount to the diamond frame of the bicycle; attaching swing arms that swing around an arm joint axle to the generally vertical bars; attaching the swing arms to generally horizontal bars; and connecting the generally horizontal bars to the foot platforms.

The method may further include attaching a crossbar beam using a crossbar joint connection that connects both of the generally vertical bars across the rear portion of the bicycle.

The method may further include attaching an extension member to the distal generally vertical bar, in order to move the generally vertical bar away from a chain or derailleur.

The method may further include connecting the foot platform so that it is pivotable around the crank axle.

The swing arms may swing adjacent to the rear wheel of a bicycle.

The foot platforms may be attached to the crank arm using a pedal axle connector.

According to another embodiment, a device to provide multiple uses of exercising includes a diamond frame standard bicycle having a frame and two crank arms, a pair of generally vertical bars presented on both the right and left sides of the standard bicycle, and a pair of swing arms attached to the generally vertical bars, the swing arms presented on both the right and left sides of the standard bicycle. The swing arms are attached rotationally to an axle, the swing arms each being hingedly attached to a pair of generally horizontal bars presented on opposite sides of the frame of the standard bicycle. The generally horizontal bars are intermediately connected between the swing arms and a pair of foot platforms, and the foot platforms are hingedly attached to the crank arms and move rotationally around the crank axle. The device also includes a rear triangle mount that is an intermediary to hingedly connect the generally vertical bars to the diamond frame of the bicycle. The rear triangle mount has two plates that are formed to fasten onto the rear stays of the back triangle of diamond bicycle frame and are connected using threaded bolts. The generally vertical bars are hingedly connected to the swing arms, and the swing arms are hingedly connected to the horizontal bars.

A crossbar beam may be connected through a crossbar joint connection from the proximal generally vertical bar to the distal generally vertical bar.

An extension member may be hingedly connected between the generally vertical bar and the swing arm, on each side of the bicycle.

The foot platforms may be secured by at least one bracket.

The foot platforms may be connected to the crank arms through a pedal axle connector.

The pedal axle connector may be connected to the foot platform at a foot platform socket on the bottom side of the foot platform.

The foot platforms may be attached rotationally to the generally horizontal bars.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
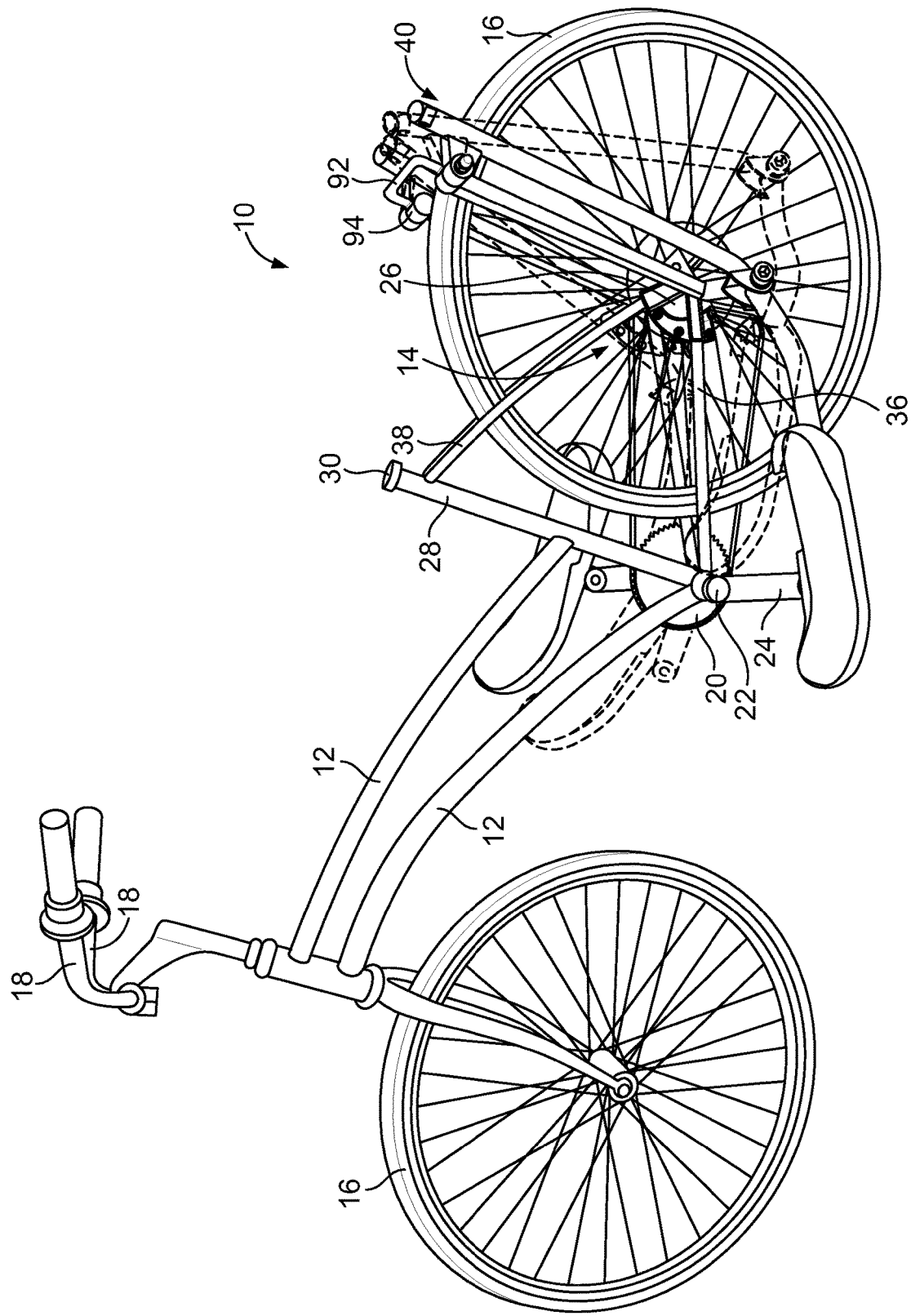
FIG. 1 illustrates a perspective view of a standard bicycle as is known in the art with a bicycle to elliptical conversion apparatus incorporated thereon, according to a first embodiment.

The elliptical pedaling motion aspect of the conventional elliptical machine, e.g., the technology of U.S. Pat. No. 7,717,446 discussed above, is not transformable, and elliptical machines using this technology can be very expensive. To remedy these issues, embodiments described herein provide for a dual-use exercise machine that can be used in an effective way to decrease the aforementioned strain and stress on the body by converting the circular pedaling motion of a conventional cycle into a non-circular, e.g., elliptical, motion of a human operator, while also increasing efficiency and decreasing costs for consumers.

In particular, embodiments include a conversion apparatus that converts a standard cycle having a drive train based upon a circular pedaling motion into an exercise machine in which a human operator uses a non-circular motion in place of the circular pedaling motion of the standard cycle. In various embodiments, the conversion apparatus can convert the standard cycle into an elliptical-type cycle, a stationary elliptical exercise machine, a rowing machine, or other exercise machine in which a human operator exercises by operating the machine with non-circular motions of portions of the operator's body. While the embodiments described herein convert a standard cycle into an elliptical exercise machine, this should not be construed as limiting, as the principles and mechanisms described herein may also be used to convert a standard cycle into different types of exercise machines.

One or more embodiments include a conversion apparatus for converting a standard bicycle or other mechanical device, e.g., exercise equipment, to an elliptical bicycle or an elliptical-type mechanical device or exercise machine, which may or may not include hand grips for simultaneously exercising the arms. The elliptical-type bicycle may be used on the road or as a stationary exercise machine, and can be converted back to a conventional bicycle when desired. The conversion apparatus can easily be installed and removed from a standard bicycle to temporarily change it to an elliptical bicycle, thereby providing for a dual-use exercise machine. The embodiments also provide this multifunctional capacity to stationary exercise machines, e.g., spin cycles and other mechanical devices as described herein.

In accordance with industry standards, the present disclosure as illustrated herein combines components of both a standard cycle and an elliptical device to achieve a decreased risk of injuries, while also acting as a dual use exercise device. The conversion apparatus allows a standard cycle, e.g., a bicycle with a diamond frame (as understood by one having ordinary skill in the art), to be reconfigured in a temporary or permanent, but convertible, method to a device that operates like that of an elliptical device.

This multi-use technology has the ability to provide the low impact exercise benefits of an elliptical device on what would otherwise be a conventional, or standard, bicycle. One of the notable aspects of the disclosed conversion apparatus is that configuration may be temporary and the conversion apparatus can be easily removed, or the conversion apparatus may be permanently integrated, but multimodal to adhere to the user's preference of either an elliptical bicycle or a standard bicycle. In the permanent installation of the conversion apparatus, the user would be able to choose a degree of non-circularity of the pedaling motion, thereby facilitating the bicycle's operation using a circular pedaling motion or using an elliptical pedaling motion without removing the conversion apparatus simply by positioning the foot platforms along a length of a bar toward or away from the circular drive gear. The multifunctioning, bicycle to elliptical conversion apparatus described herein is easy to incorporate in an existing standard bicycle, and is therefore an efficient and inexpensive alternative to prior technology. Using the conversion apparatus, a single traditional bicycle can both be used as a traditional bicycle, and as an elliptical bicycle, based on a consumer-friendly mechanism and device that decreases costs for the consumer. Using embodiments of the conversion apparatus, the customer may easily transform the traditional bicycle into a variety of types of exercise equipment based on the conversion apparatus's transformation of a non-circular motion of the human operator into a circular pedaling motion of the traditional bicycle on which the conversion apparatus is mounted. Therefore, the conversion apparatus facilitates the user to have multiple exercise machines to perform similar functions based on a single standard bicycle. Embodiments of the conversion apparatus increase overall efficiency by the use of an all-in-one type of technology as well as provide convenience to the consumer, since the conversion apparatus is easy to store and easy to use. Further, the technology allows the device to be used outdoors or indoors, in either a movable manner or a stationary manner through the optional use of a stationary mount.

Conversion of a drive train of a bicycle that is driven by circular pedaling motions of an operator to an elliptical drive train driven by non-circular pedaling motions of the operator is accomplished using the principle of a four bar linkage and coupler. In this principle, a first bar (the frame) is held stationary, while a second bar (the crank) having a first end attached to a first axis at a first end of the frame rotates 360 degrees around the first axis. A third bar (the rocker) has a first end thereof attached to a second axis at a second end of the frame and a second end thereof attached to a first end of a fourth bar (the coupler) at a third axis. The coupler couples the crank and the rocker by attaching a second end of the coupler to a fourth axis at the second end of the crank. As the crank rotates 360 degrees around the first axis, the rocker rocks back and forth relative to the frame due to being coupled at its first end to the second end of the frame and at its second end to the first end of the coupler. While the second end of the crank forms a circular path as the crank rotates 360 degrees around the first axis, a point somewhere between the first end and the second end of the coupler forms a non-circular path. By replacing a standard pedal at the second end of the crank with an apparatus that includes a rocker attached to a distant end of a frame that also attaches to the second end of the crank and a coupler having a foot platform attached thereto between the rocker and the pedal-side of the crank, the circular motion of the standard pedal can be converted to non-circular motion of the foot platform. The shape of the motion of the foot platform can be varied from a circular path when placed right at the second end of the crank where the standard pedal is conventionally attached to a path of an arc when placed right at the second end of the rocker, with various elongated, noncircular paths in between along a length of the coupler.

The principle of the four bar linkage and coupler can be applied to a standard bicycle frame to convert the standard bicycle to an elliptical-type bicycle in an embodiment by mounting a rocker arm and a coupler bar to one or more points on the bicycle frame and each of the two crank bars or two pedals attached to the two crank bars of the bicycle. In this manner, the bicycle frame is treated as the stationary first bar and the bicycle's crank bars are treated as the rotating second bar of the four bar linkage and coupler principle. Thus, in this embodiment there are two sets of rocker arms and coupler bars attached to the bicycle frame and crank bars or pedals, one set for each of the two bicycle crank bars or pedals. The two sets of rocker arms and coupler bars may be independent of each other in some embodiments, or in other embodiments may be integrated together into an apparatus having its own unified frame that couples to the bicycle frame at one or more points.

In various embodiments, additional bars could be added without departing from the four bar linkage and coupler principle described herein.

A standard bicycle includes a frame, a drive wheel, handlebars, and a crankshaft. Additionally, the standard bicycle includes a seat and regular pedals, which are components that are removable to accommodate installation of an embodiment of the bicycle to elliptical conversion apparatus disclosed herein. Almost all bicycles will have the same standard features and will be able to be retrofitted with an embodiment of the conversion apparatus. In fact, many bicycles may be functionally identical with simply a difference in ornamental design. Differences may include a difference in wheel size, proximity of the wheels or handlebars to one another, height of the bicycle, colors used to paint the bicycle, and other nonessential differences.

For the purposes of promoting an understanding of the principles of the invention, reference has been made to the embodiments illustrated in the drawings, and specific language has been used to describe these embodiments below. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

FIG. 1 illustrates a perspective view of a standard bicycle 10 as is known in the art with a conversion apparatus 40 incorporated thereon, according to a first embodiment. The standard bicycle 10 of FIG. 1 includes a frame 12, diamond frame 14, wheels 16, a handlebar 18, front gear wheel 20, crank axle 22, crank bar 24 and crank 26. The standard bicycle 10's conventional seat and pedals have been removed as illustrated in FIG. 1 during the process of retrofitting the standard bicycle 10 using the conversion apparatus 40 to create an elliptical bicycle. In this embodiment, the conversion apparatus 40 turns the conventional diamond frame bicycle 10 into an elliptical bicycle by mounting to the rear triangle of the bicycle frame 12 and screwing into the crank bar 24.

In the first embodiment depicted in FIG. 1, the conversion apparatus 40 includes a crossbar beam 92 and a crossbar joint connection 94. The first embodiment of the conversion apparatus 40 is illustrated as being retrofitted onto the standard diamond frame 14 of the standard bicycle 10. The standard diamond frame 14 includes a diamond frame coupler bar 36 and a diamond frame angled bar 38. The first embodiment also includes a seat post 28, which is the place in which the standard bicycle 10 ordinarily holds a regular seat. In accordance with this embodiment, the regular seat of the standard bicycle is removed and replaced with a seat insert 30, which may be a type of plug component as known in the art.

The broken lines in FIG. 1 illustrate the elliptical pedaling motion that takes place when riding the standard bicycle 10 having the conversion apparatus 40 installed thereon as disclosed and illustrated herein. This motion is a forward and backward pedaling motion combined with a slight upward and downward motion to provide a movement that resembles an elliptical exercise machine. The ability to exercise in an elliptical fashion using a standard bicycle converted in a nonpermanent way into an elliptical exercise machine provides for the many benefits described herein, e.g., being efficient, cost-effective, and inexpensive.

Figure 2:
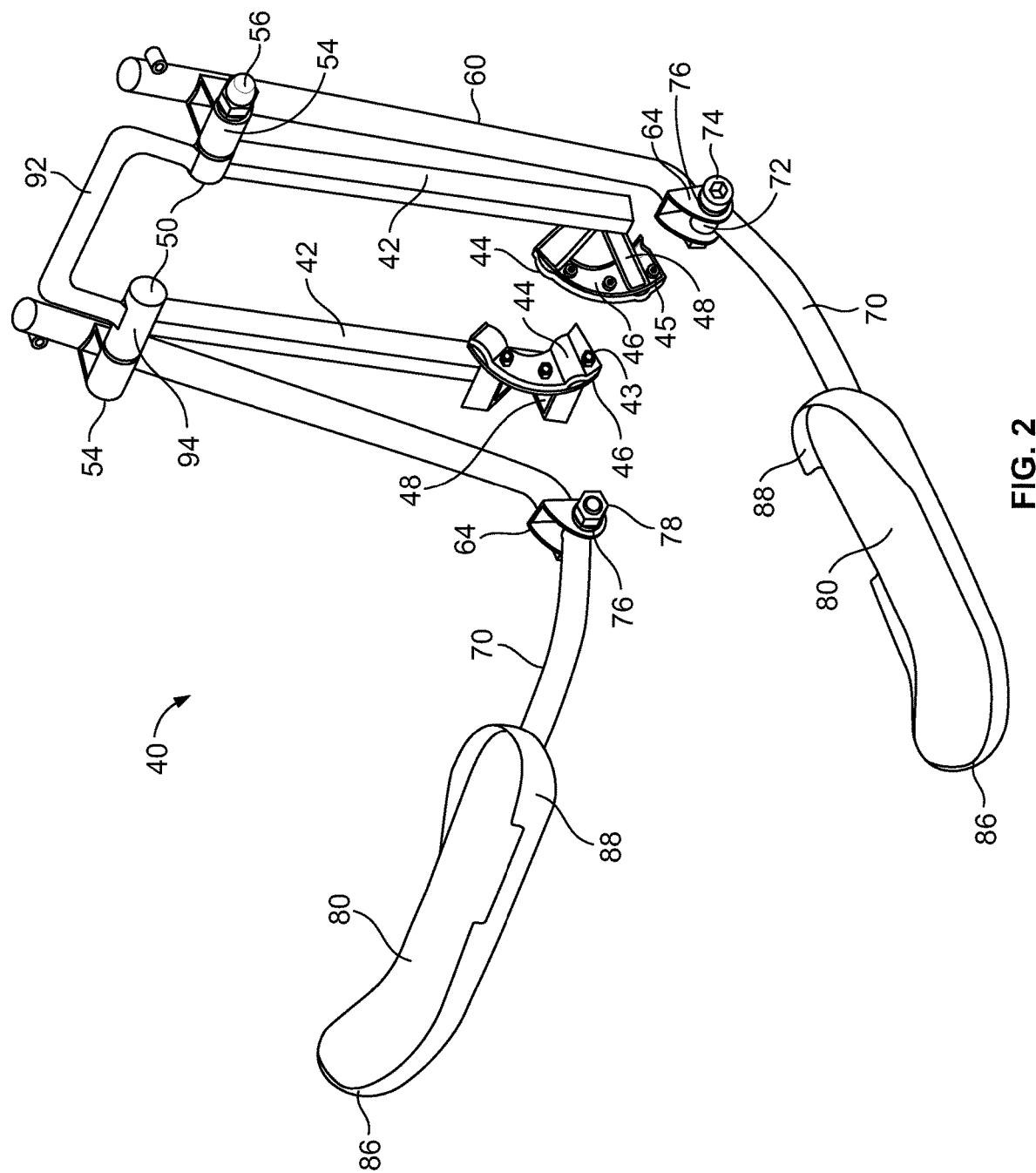
FIG. 2 illustrates a perspective view of the first embodiment of the conversion apparatus of FIG. 1, including the crossbar beam and the crossbar joint connection, standing alone.

FIG. 2 illustrates a perspective view of the first embodiment of the conversion apparatus 40 of FIG. 1, including the crossbar beam 92 and the crossbar joint connection 94, standing alone. The conversion apparatus 40 has vertical bars 42 to attach to the diamond frame 14 of the standard bicycle 10 utilizing plate connector nuts 43, plate connector bolts 45, inner clamp plates 44, outer clamp plates 46, and plate connector links 48. As illustrated in FIG. 2, arm joint axles 50 connect to the crossbar beam 92 at the crossbar joint connections 94. The vertical bars 42 and the elements used to attach the vertical bars 42 together and to the bicycle 10 are stationary and effectively form an extension of the frame of the bicycle. The collection of stationary elements of the conversion apparatus 40 including the vertical bars 42 can be referred to as a stationary frame structure of the conversion apparatus 40.

The arm joint axles 50 connect the vertical bars 42 with swing arms 60 using joint axle bolts 56 and joint axle sockets 54. The arm joint axles 50 are pivot points from which the swing arms 60 swing back and forth. The swing arms 60 are connected to coupler bars 70 at lower joint apertures 64 by way of lower joint sockets 72. This connection is established at lower joint bolts 74, lower joint washers 76, and lower joint nuts 78.

Figure 3:
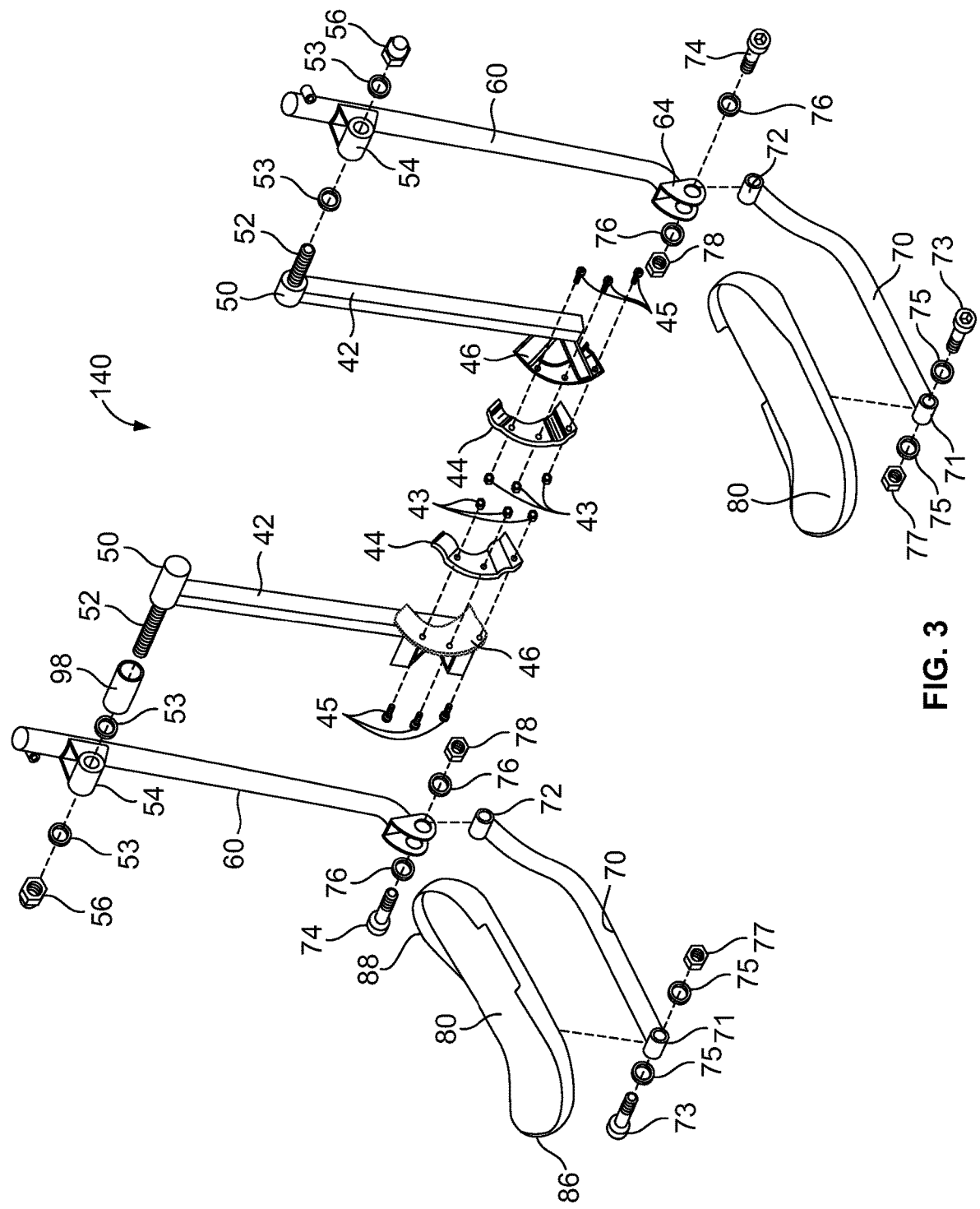
FIG. 3 illustrates an exploded view of a second embodiment of the bicycle to elliptical conversion apparatus, standing alone.

The coupler bars 70 are then connected to foot platforms 80, of which an exploded version is shown in FIG. 3 and explained further below. The foot platform 80, which is shaped like that of an elliptical pedal as known in the art, has a foot platform front guard 86 and a foot platform rear guard 88.

The four bar linkage and coupler principle is implemented by the conversion apparatus 40, with the crank bar 24 serving as the crank of the four bar linkage, the coupler bar 70 serving as the coupler of the four bar linkage, the vertical bar 42 combining with the diamond frame 14 to serve as the frame of the four bar linkage, and the swing arm 60 serving as the rocker of the four bar linkage.

FIG. 3 illustrates an exploded view of a second embodiment of the bicycle to elliptical conversion apparatus 140, standing alone. In contrast to the conversion apparatus 40 of the first embodiment, the conversion apparatus 140 of the second embodiment does not include a crossbar beam or crossbar joint connections. Rather, the two vertical bars 42 are separate from one another and only connected through the frame of the bicycle 110 on which they are installed. The vertical bars 42 and the elements used to attach the vertical bars 42 to the bicycle are stationary and effectively form an extension of the frame of the bicycle. The collection of stationary elements of the conversion apparatus 140 including the vertical bars 42 can be referred to as a stationary frame structure of the conversion apparatus 140.

The conversion apparatus 140 of the second embodiment also differs from the conversion apparatus 40 of the first embodiment in that the second embodiment includes an extension member 98 between the distal end's arm joint axle 50 and joint axle socket 54. The extension member 98 may be present in the embodiment in order to enable movement of the coupler bar 70 away from the chain or derailleur of a standard bicycle. The extension member 98 may be connected to the distal end of the bicycle in between the distal vertical bar 42 and the distal swing arm 60, as illustrated in FIG. 2.

The other parts of the second embodiment illustrated in FIG. 3 are essentially identical to those within the first embodiment illustrated in FIG. 2; however FIG. 3 is an exploded view, and illustrates additional parts of the conversion apparatus 140, which may also be incorporated in the first embodiment. For instance, the connections between the coupler bars 70 and the foot platforms 80 include foot platform sockets 71, foot platform bolts 73, foot platform washers 75, and foot platform nuts 77. Further, the arm joint axles 50 use joint axle inserts 52 that are inserted into the joint axle sockets 54 to perform the aforementioned connections in FIG. 2. The connections use joint axle washers 53 in addition to the other indicated parts.

Figure 4:
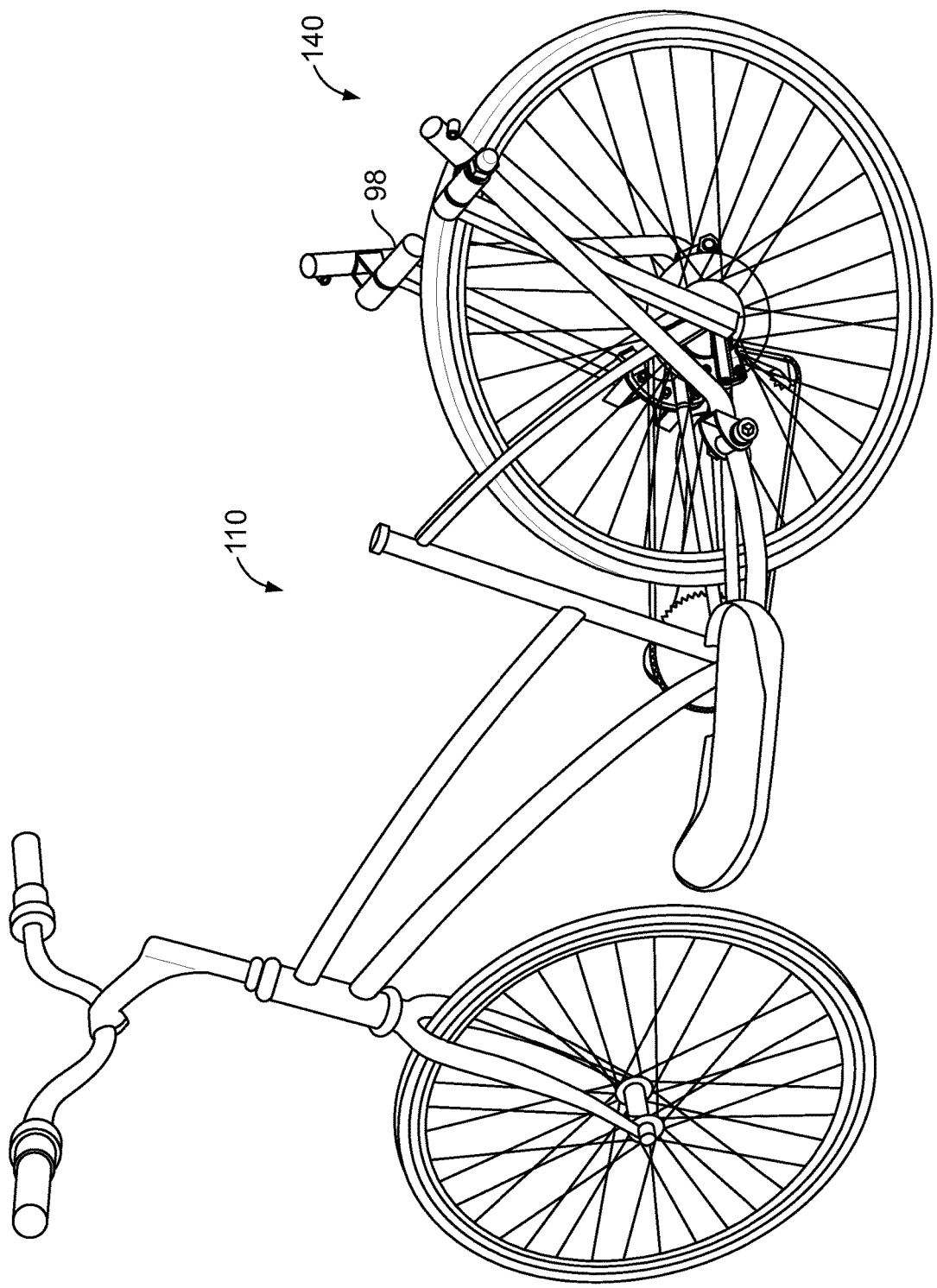
FIG. 4 illustrates a perspective view of the second embodiment of the standard bicycle and conversion apparatus incorporated thereon.

FIG. 4 illustrates a perspective view of the second embodiment of the standard bicycle 110 and conversion apparatus 140 incorporated thereon. As illustrated, the second embodiment includes the extension member 98 within the conversion apparatus 140, but does not include the crossbar beam or crossbar joint connection of the first embodiment. Other parts of the second embodiment shown in FIG. 4 are essentially identical with those of the first embodiment. As stated with reference to FIG. 3, the extension member 98 may enable the movement of the distal coupler bar 70 such that it is further away from the chain or derailleur of the standard bicycle 110.

Figure 5:
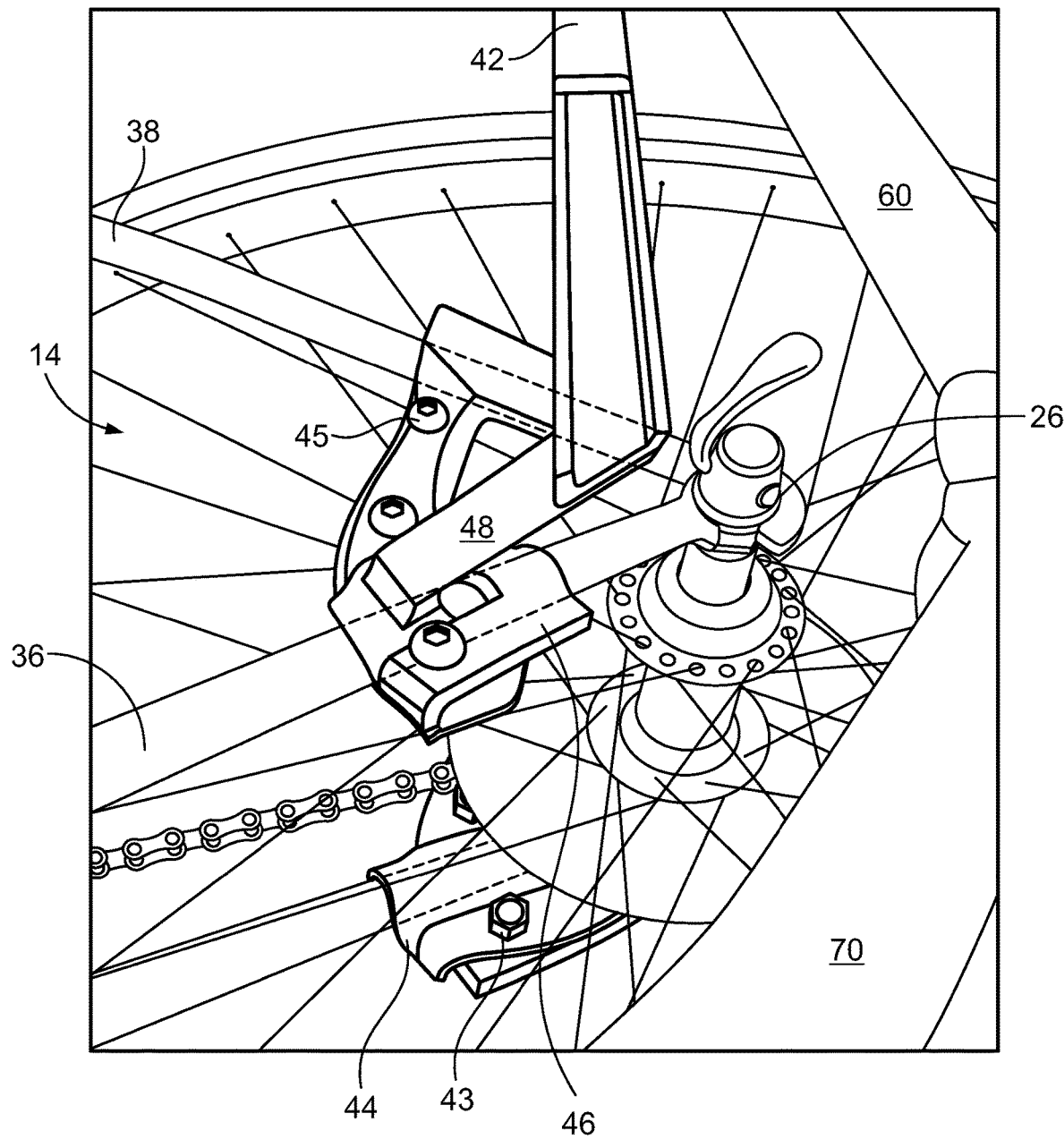
FIG. 5 illustrates a perspective view of the connection of the conversion apparatus to the diamond frame of the standard bicycle using plate connectors, according to both the first and second embodiments.

FIG. 5 illustrates a perspective view of the connection of the conversion apparatus 40 or 140 to the diamond frame 14 of the standard bicycle 10 or 110 using plate connectors, according to both the first and second embodiments. Specifically, the inner clamp plates 44, the outer clamp plates 46, the plate connector nuts 43, the plate connector bolts 45, and the plate connector links 48 effectively attach the conversion apparatus 40 or 140 to the crank 26 using the diamond frame coupler bar 36 and the diamond frame angled bar 38. The surrounding arms of the conversion apparatus 40 or 140 itself are shown as well, including the vertical bar 42, the swing arm 60, and the coupler bar 70. The conversion apparatus 40 or 140 is assembled to the diamond corner of the bicycle by connecting to the rear triangle of the diamond frame 14 of the bicycle, and then being screwed into place with the aforementioned parts to be effectively attached to the crank 26. While not directly connected to the rear wheel 16 or the crank 26, the conversion apparatus 40 or 140 nevertheless comprises a reciprocating drive mechanism that is rear wheel oriented by mounting directly to the rear triangle of the diamond frame 14.

Figure 6:
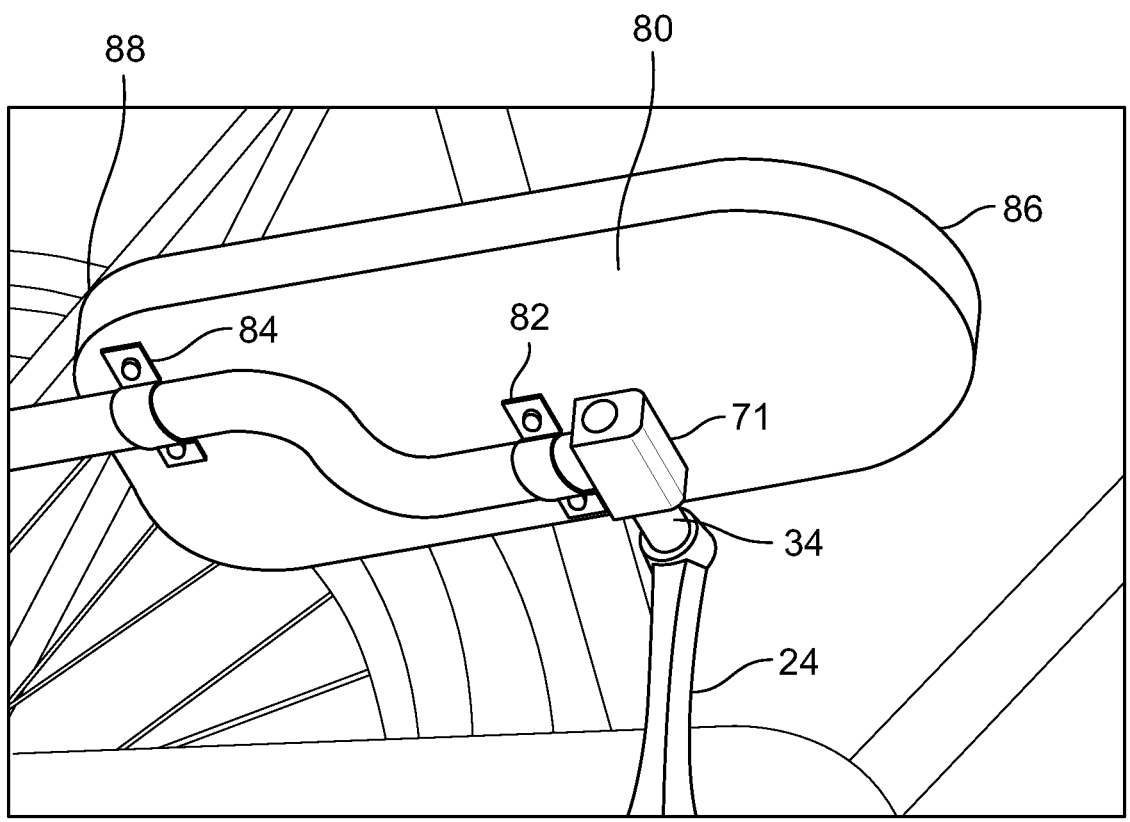
FIG. 6 illustrates a perspective view of the underside of one of the foot platforms, according to both the first and second embodiments.

FIG. 6 illustrates a perspective view of the underside of one of the foot platforms 80, according to both the first and second embodiments. The foot platform 80, which is shaped like an elliptical pedal, includes a foot platform front guard 86 and a foot platform rear guard 88. FIG. 6 illustrates the foot platform 80 connected to the crank bar 24 and axles for the pedal through the foot platform socket 71 at a pedal axle connector 34. Additionally, the foot platform 80 is secured by a front foot platform bracket 82 and rear foot platform bracket 84.

In the disclosed embodiments, the vertical bar 42, swing arm 60, and coupler bar 70 can be made of metal; however, another material that is sufficiently strong and lightweight to meet the durability and weight requirements of a particular application of the embodiments may be used instead. This is also true for the plates, nuts, bolts, washers, and other connecting pieces within the disclosed embodiments, which may also be made of metal, e.g., aluminum, titanium, copper, brass, bronze, zinc, carbon steel, and stainless steel.

Through the swift removal of the conventional pedals and seat of a standard bicycle (e.g., standard bicycle 10 or 110), and reconfiguration of the standard bicycle by attaching the conversion apparatus 40 or 140 at both the crank axle 22 and the rear portion of the diamond frame 14, embodiments of the conversion apparatus 40 or 140 can be easily assembled onto the standard bicycle.

Figure 7:
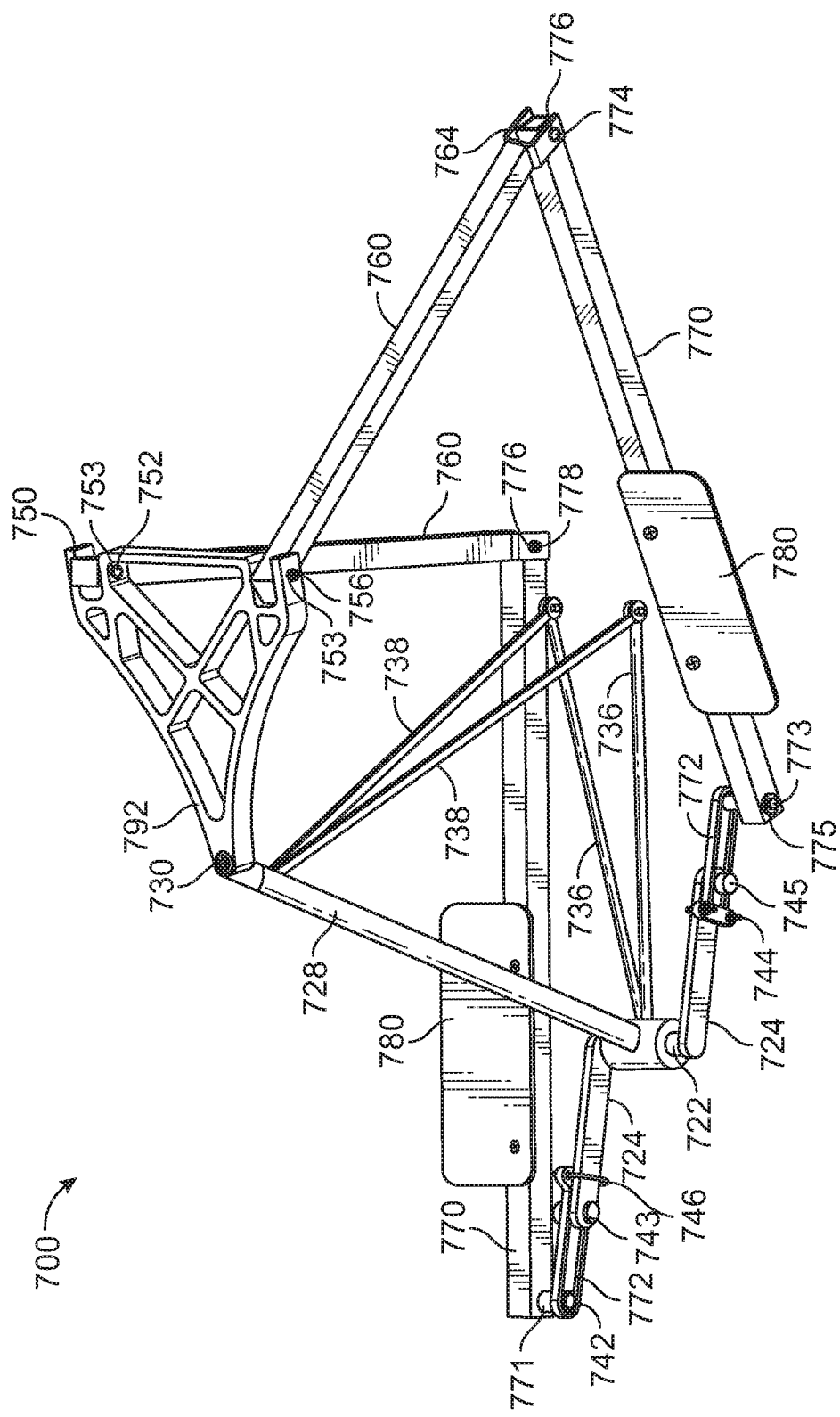
FIG. 7 illustrates a perspective view of a third embodiment of the bicycle to elliptical conversion apparatus coupled with selected elements of a standard bicycle.

FIG. 7 illustrates a perspective view of a third embodiment of the bicycle to elliptical conversion apparatus 700 coupled with selected elements of a standard bicycle. In this embodiment, the conversion apparatus 700 turns the conventional diamond frame bicycle into an elliptical bicycle by mounting to the seat post 728 using a seat post insert 730 and screwing into the crank bars 724. Thus, the third embodiment of the bicycle to elliptical conversion apparatus 700 has three contact points with the standard bicycle. The illustrated elements of a standard bicycle in FIG. 7 include the seat post 728, diamond frame coupler bars 736, diamond frame angled bars 738, crank axle 722, and crank bars 724.

The triconnect frame structure 792 provides a stable platform upon which a bicycle seat could be attached to replace the bicycle seat removed from the seat post 728 in order to facilitate the triconnect frame structure 792 being attached to the seat post 728 using the seat post insert 730 disposed in the front corner of the triconnect frame structure 792. The triconnect frame structure 792 functions as an extension of the bicycle frame for each of two swing arms 760 to be coupled at a respective rear corner of the triconnect frame structure 792. Each swing arm 760 is coupled to the triconnect frame structure 792 at an arm joint aperture 750 using a joint axle bolt 752 passing through a hole in each side of the joint aperture 750, a hole in the swing arm 760, and a set of joint axle washers 753 on either side of the swing arm 760. The joint axle insert 752 is fastened to the arm joint aperture 750 using a joint axle nut 756.

Each swing arm 760 is coupled to a coupler bar 770 at a lower joint aperture 764. An end of the coupler bar 770 fits within the lower joint aperture 764 and a lower joint bolt 774 passes through a pair of holes on either side of the lower joint aperture 764, a hole in the end of the coupler bar 770, and a pair of lower joint washers 775 on either side of the hole in the end of the coupler bar 770. The lower joint bolt 774 is attached in place using a lower joint nut 778.

Each coupler bar 770 is fastened to the respective crank bar 724 of the bicycle in a manner that permits adjustment of the effective length of the crank bar 724 when coupled with the coupler bar 770. This is accomplished by using a crank bar extender 772 that is firmly connected to the crank bar 724 in place of the standard bicycle pedal and extends outward from the crank bar 724 in a radial direction away from the crank axle 722 toward an end of the crank bar extender 772 that rotationally couples with an end of the coupler bar 770. A crank bar attachment bolt 745 passes through an oblong opening of the crank bar extender 772 at an adjustable position along the length of the crank bar extender 772 and fastens to the threaded crank bar hole 743 to facilitate adjustment of the combined length of the crank bar 724 and crank bar extender 772. A crank bar end of the crank bar extender 772 is firmly attached to the crank bar 724 so that the crank bar extender 772 is effectively attached to the crank bar 724 at two points in order to ensure stability. A crank bar extender U-bolt 746 fastens the crank bar 724 to the crank bar end of the crank bar extender 772 by surrounding the crank bar 724, passing through two holes at the crank bar end of the crank bar extender 772, and then being fastened into place using two crank bar extender U-bolt nuts 744. The crank bar extender 772 rotationally couples with the coupler bar 770 at an end of the crank bar extender 772 opposite the crank axle 722 using a crank bar extender axle bolt 773 that passes through a hole in the end of the coupler bar 770, one or more crank bar extender axle washers 775 on the outside or both sides of the coupler bar 770, and a crank bar extender axle extension tube disposed between the crank bar extender 772 and the coupler bar 770. The crank bar extender axle bolt 773 is fastened to the crank bar extender 772 using a crank bar extender axle nut 742.

An elliptical foot platform 780 is fastened to each coupler bar 770 at a position between the crank bar end of the coupler bar 770 where the coupler bar 770 attaches to the crank bar extender 772, and the swing arm end of the coupler bar 770 where the coupler bar 770 attaches to the swing arm 760. A path traversed by the human operator's foot while pedaling the bicycle using the bicycle to elliptical conversion apparatus 700 is dependent upon the position of the elliptical foot platform 780 between the crank bar end and the swing arm end of the coupler bar 770 as discussed previously. The elliptical foot platform 780 may be fastened to the coupler bar 770 using screws, rivets, welds, glue, straps, or other fastening mechanisms as known in the art, and in configurations shown in FIG. 7 or discussed elsewhere herein.

The four bar linkage and coupler principle is implemented by the conversion apparatus 700, with the combined crank bar 724 and crank bar extender 772 serving as the crank of the four bar linkage, the coupler bar 770 serving as the coupler of the four bar linkage, the triconnect frame structure 792 combining with the seat post 728 to serve as the frame of the four bar linkage, and the swing arm 760 serving as the rocker of the four bar linkage.

In various embodiments, a shape of the elliptical foot platform 780 may take many forms, and is not limited to those forms shown in the enclosed drawings. In addition, any of the components of the conversion apparatus 700 can be fastened to other components of the conversion apparatus 700 as indicated and illustrated herein using not only the fastening mechanisms described, but alternative using other fastening mechanisms as known in the art. Also, a length and shape of the components of the conversion apparatus 700 can vary according to an application at hand, and one of ordinary skill in the art would be able to apply the teachings herein to determine an appropriate length and shape of the components according to an the application at hand without undue experimentation.

While the third embodiment of the bicycle to elliptical conversion apparatus 700 is described as converting the standard bicycle to an elliptical bicycle or exercise machine, this should not be construed as limiting, as in various embodiments, the bicycle to elliptical conversion apparatus 700 may convert the standard bicycle into a different exercise machine. For example, the bicycle to elliptical conversion apparatus 700 may be modified in other embodiments to convert the bicycle to a rowing machine by attaching handles to the coupler bars 770 at or near the swing arm end of the coupler bars 770, or to the swing arms 760 at or near the end that couples with the coupler bars 770. Although the handles are not shown in the drawings attached to the coupler bars 770 or to the swing arms 760 as described, in various embodiments the handles may be similar to handles shown on handlebars in FIGS. 1, 4, 8, 9, 11, and 12, or on upright handles 846 shown in FIG. 8, and one of ordinary skill in the art would understand how to attach similar handles to the coupler bars 770 or to the swing arms 760. In these rowing machine embodiments, the bicycle having the conversion apparatus 700 installed could be used in a stationary configuration as a sort of flywheel for use in a rowing machine capacity. For example, the human operator may be seated behind the bicycle retrofitted with the conversion apparatus, facing the bicycle and conversion apparatus, to operate the drive mechanism of the combined bicycle and conversion apparatus. A desired length of the coupler bars 770 and the swing arms 760 for optimal use in an application of the conversion apparatus as a rowing machine could be determined by one of ordinary skill in the art without undue experimentation. The bicycle having the conversion apparatus 700 installed can therefore function as a rowing machine or as an elliptical-type exercise machine by simply replacing the foot platforms 880 with handles, or in some embodiments, having both food platforms 880 and handles installed on the conversion apparatus 700 simultaneously.

Figure 8:
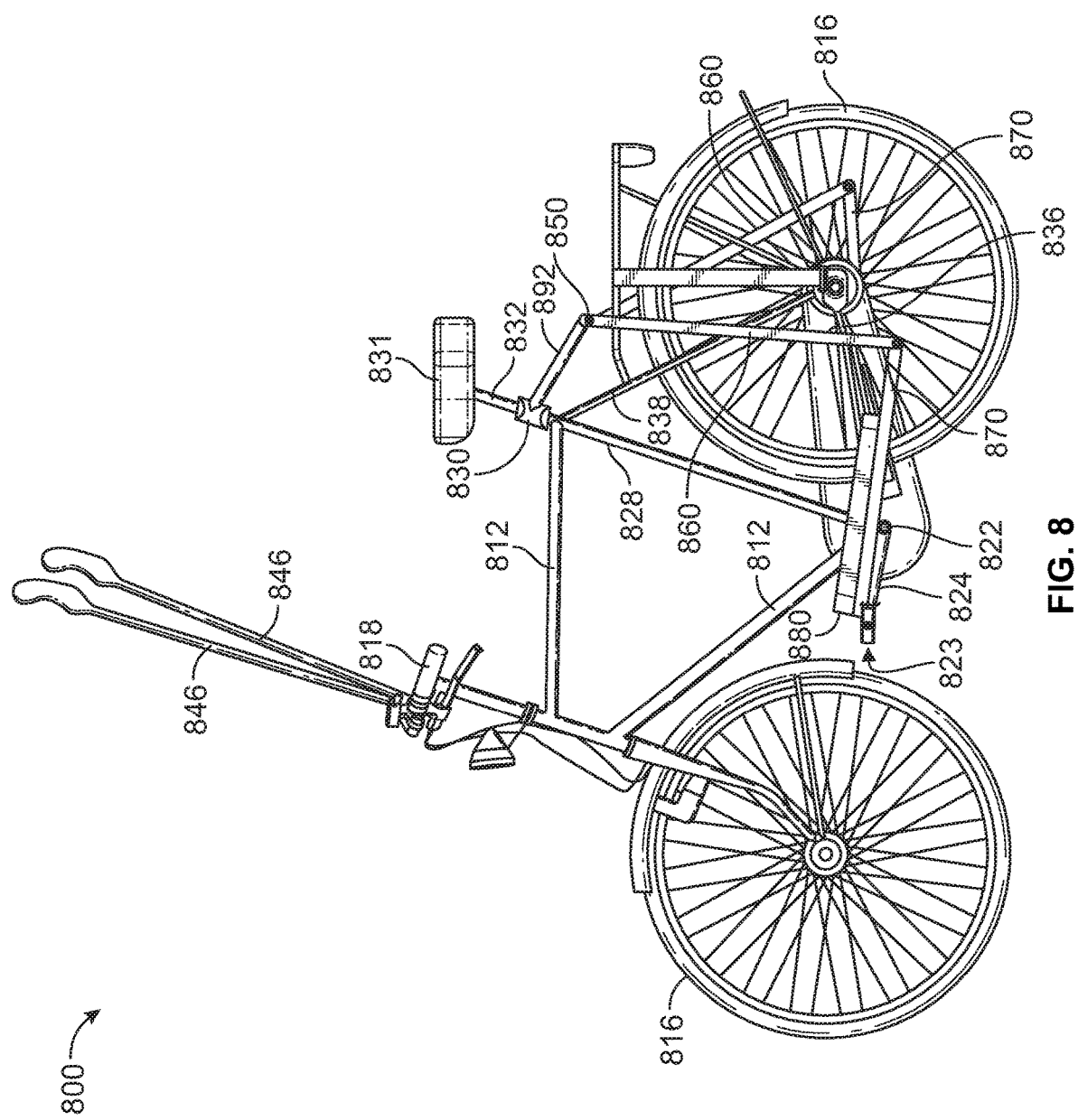
FIG. 8 illustrates a perspective view of a fourth embodiment of the bicycle to elliptical conversion apparatus coupled with a standard bicycle.
Figure 9:
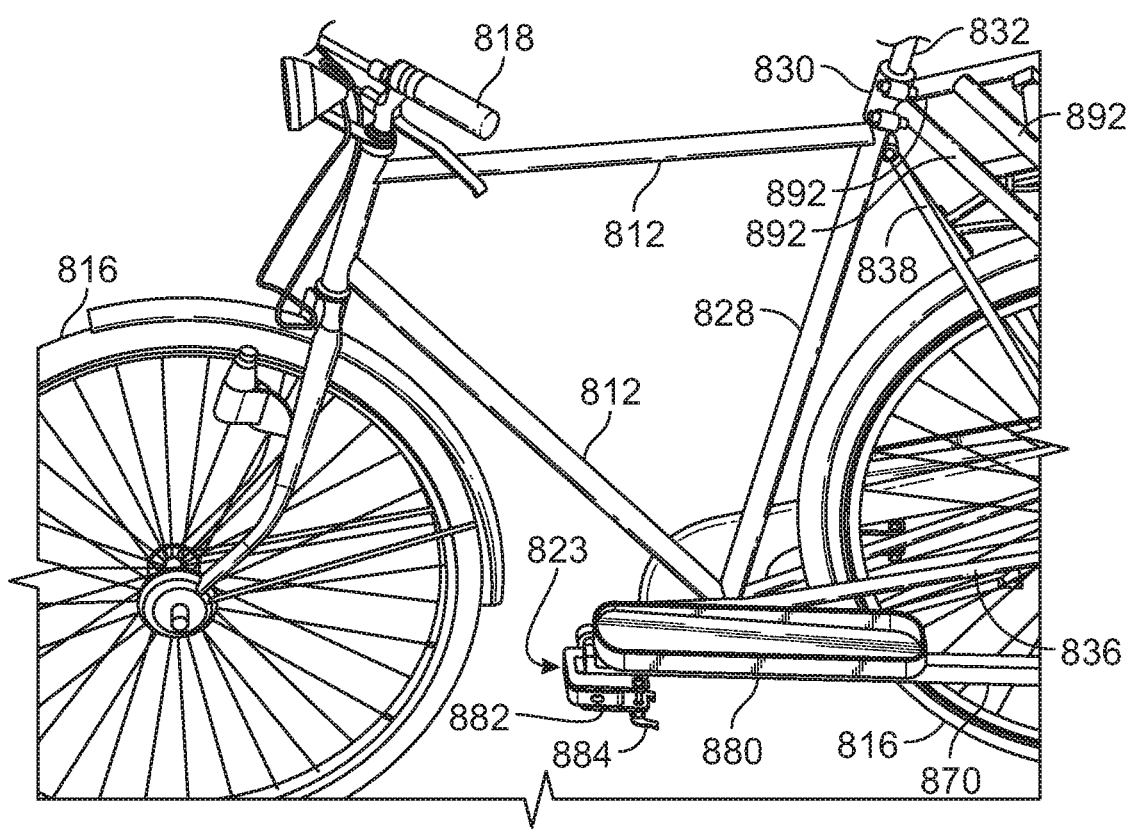
FIG. 9 illustrates a detailed view of the attachment points of the conversion apparatus to the standard bicycle of FIG. 8, according to an embodiment.

FIG. 8 illustrates a perspective view of a fourth embodiment of the bicycle to elliptical conversion apparatus 800 coupled with a standard bicycle. FIG. 9 illustrates a detailed view of the attachment points of the conversion apparatus 800 to the standard bicycle of FIG. 8, according to an embodiment. The illustrated elements of a standard bicycle in FIG. 8 include the seat post 828, diamond frame coupler bars 836, diamond frame angled bars 838, crank axle 822, crank bars 824, and bicycle pedals 823. In the fourth embodiment of the bicycle to elliptical conversion apparatus 800, the conversion apparatus 800 turns the conventional diamond frame bicycle into an elliptical bicycle by mounting to the seat post tube 832 of the bicycle that attaches the bicycle seat 831 to the bicycle's seat post 828 using a detachable seat post attachment device 830 and also clamping onto the bicycle pedals 823 using pedal clamps 882. Like the third embodiment of the bicycle to elliptical conversion apparatus 700, the fourth embodiment of the bicycle to elliptical conversion apparatus 800 has three contact points with the standard bicycle. In contrast to the third embodiment of the bicycle to elliptical conversion apparatus 700, the fourth embodiment of the bicycle to elliptical conversion apparatus 800 is easier to connect to the bicycle and remove from the bicycle because the detachable seat post attachment device 830 is easily attachable to and detachable from the bicycle's seat post tube 832, and the pedal clamps 882 are also easily attachable to and detachable from the bicycle pedals 823 using quick release levers 884. In an embodiment, the detachable seat post attachment device 830 may be attached by screwing a curved plate onto a curved plate receiver, such that the curved plate and curved plate receiver snugly hold the seat post tube 832 therebetween. In other embodiments, the curved plate and curved plate receiver may be connected using a quick release lever, a hinge and latch, or other connection mechanisms as known in the art.

A triconnect frame structure 892 with which the detachable seat post attachment device 830 is integrated functions as an extension of the bicycle frame for each of two swing arms 860 to be coupled at a respective rear corner of the triconnect frame structure 892. Each swing arm 860 is coupled to the triconnect frame structure 892 at an arm joint aperture 850. Each swing arm 860 is coupled to a coupler bar 870 at a lower end of the swing arm 860.

Each coupler bar 870 is fastened to the pedal 823 that is in turn attached to the respective crank bar 824 of the bicycle. This is accomplished by using the quick release levers 884 to quickly and easily clamp the pedal clamps 882 onto the bicycle pedals 823. The pedal clamps 882 are firmly attached to the elliptical foot platforms 880 in this embodiment for stability and ease of operation. The elliptical foot platform 880 may be fastened to the coupler bar 870 and/or the pedal clamp 882 using screws, rivets, welds, glue, straps, or other fastening mechanisms as known in the art, and in configurations shown in FIG. 7 or discussed elsewhere herein.

In addition, the fourth embodiment of the bicycle to elliptical conversion apparatus 800 also includes a pair of upright handles 846 to improve riding position on the bicycle after conversion into an elliptical bicycle using the conversion apparatus 800.

The components of the fourth embodiment of the bicycle to elliptical conversion apparatus 800 shown in FIGS. 8 and 9 may be connected with one another in various manners as discussed previously with respect to the third embodiment of the bicycle to elliptical conversion apparatus 700 shown in FIG. 7 or as otherwise understood by one of ordinary skill in the art.

Figure 10:
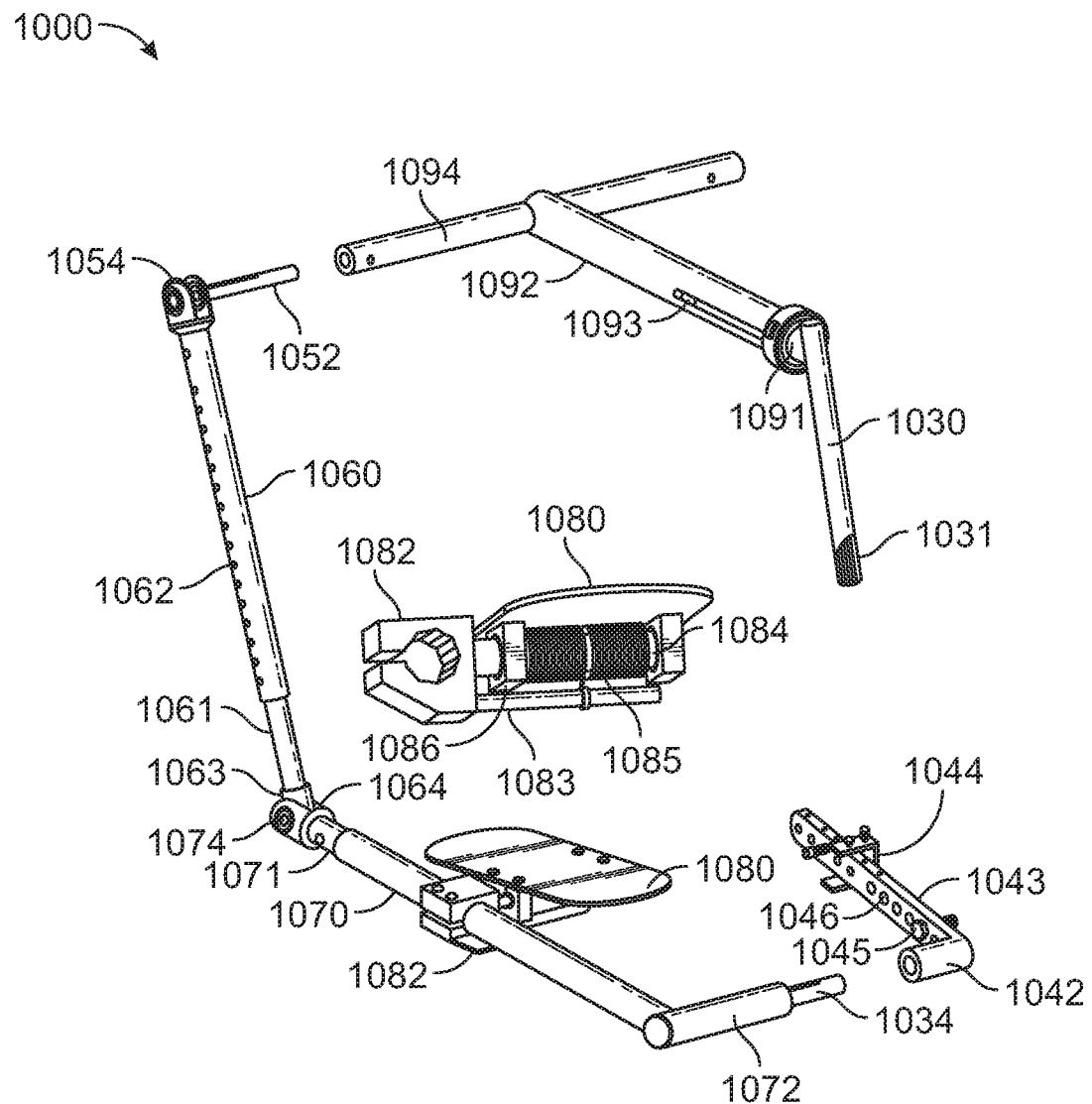
FIG. 10 illustrates an exploded view of a fifth embodiment of the conversion apparatus, according to an embodiment.
Figure 11:
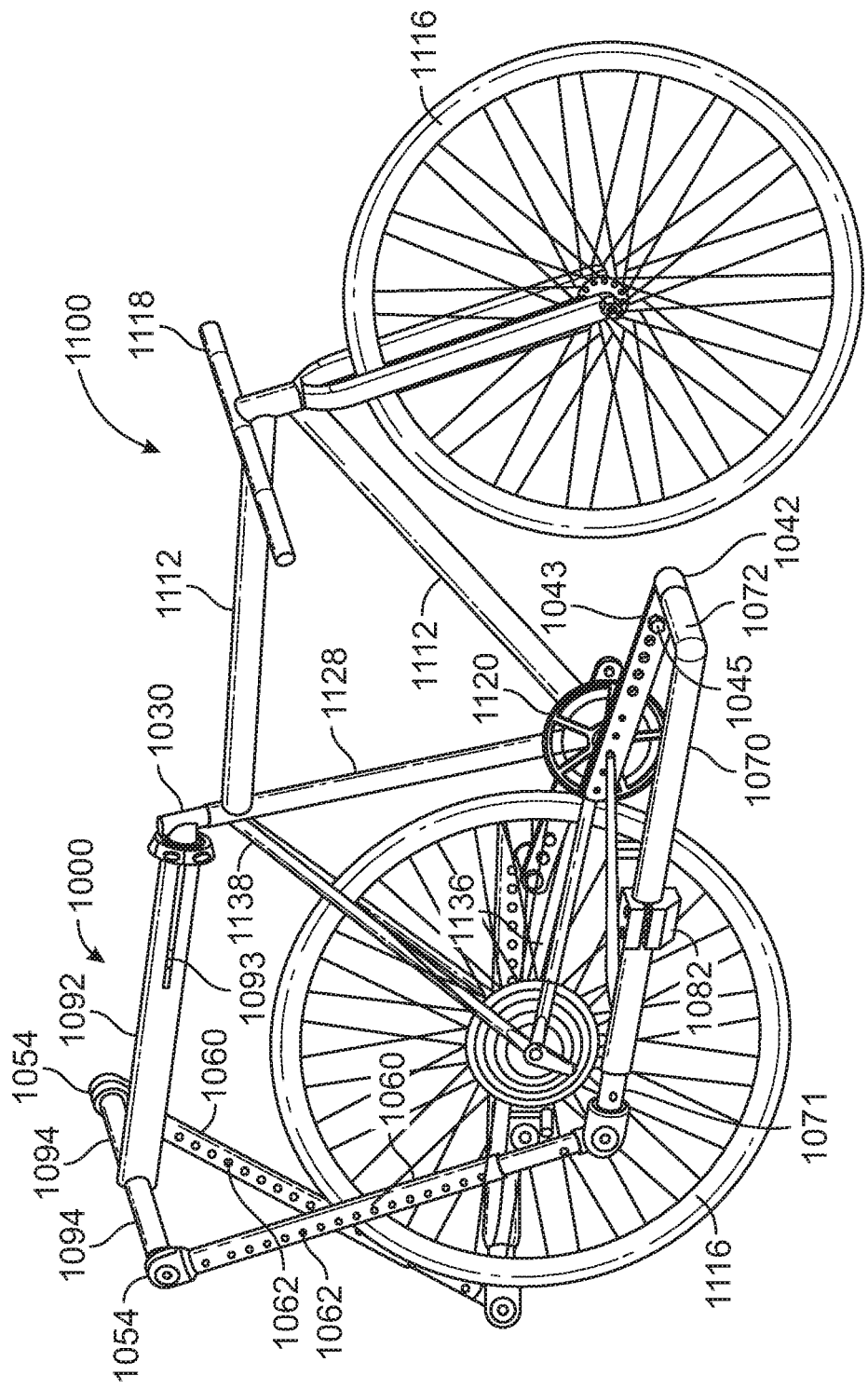
FIG. 11 illustrates the conversion apparatus of FIG. 10 incorporated in a standard bicycle, according to an embodiment.

FIG. 10 illustrates an exploded view of a fifth embodiment of the conversion apparatus 1000, according to an embodiment. FIG. 11 illustrates the conversion apparatus 1000 of FIG. 10 incorporated in a standard bicycle 1100, according to an embodiment. In the fifth embodiment, the conversion apparatus 1000 turns the conventional diamond frame bicycle 1100 into an elliptical bicycle by mounting to the seat post 1128 using a seat post insert 1130 and attaching to each crank bar 1124 on each side of the front gear wheel 1120. Thus, the fifth embodiment of the bicycle to elliptical conversion apparatus 1000 has three contact points with the standard bicycle 1100. The illustrated elements of the standard bicycle 1100 in FIG. 11 include the bicycle frame 1112, seat post 1128, diamond frame coupler bars 1136, diamond frame angled bars 1138, wheels 1116, handlebars 1118, and crank bars 1124.

The triconnect frame structure 1092 provides a stable platform upon which a bicycle seat could be attached to replace the bicycle seat removed from the seat post 1128 in order to facilitate the triconnect frame structure 1092 being attached to the seat post 1128 using the seat post insert 1030 disposed in the front of the triconnect frame structure 1092. The seat post insert 1030 is firmly attached to the seat post 1128 of the bicycle frame 1112 using a seat post insert expansion nut 1031. The triconnect frame structure 1092 functions as an extension of the bicycle frame 1112 for each of two swing arms 1060 to be coupled at a respective side of crossbar beam 1094 attached to a rear end of the triconnect frame structure 1092. Each swing arm 1060 is coupled to the crossbar beam 1094 at an arm joint aperture 1054 using a joint axle bolt 1052 passing through a hole in each side of the arm joint aperture 1054.

Each swing arm 1060 is coupled to a coupler bar 1070 at a lower joint aperture 1064. A lower arm end 1063 of the swing arm 1060 fits within the lower joint aperture 1064 attached to the coupler bar 1070 and a lower joint bolt 1074 passes through a pair of holes on either side of the lower joint aperture 1064 and a hole in the lower arm end 1063.

Each coupler bar 1070 is fastened to the respective crank bar 1124 of the bicycle 1100 in a manner that permits adjustment of the effective length of the crank bar 1124 when coupled with the coupler bar 1170. This is accomplished by using a crank bar extender 1043 that is firmly connected to the crank bar 1124 in place of the standard bicycle pedal and extends outward from the crank bar 1124 in a radial direction away from the front gear wheel 1120 toward an end of the crank bar extender 1043. A crank bar end of the crank bar extender 1043 is firmly attached to the crank bar 1124 so that the crank bar extender 1043 is effectively attached to the crank bar 1124 at two points in order to ensure stability. The crank bar extender 1043 attaches to the crank bar 1124 using a crank bar clamp 1044 that holds the crank bar 1124 snugly against the crank bar extender 1043 while clamping to the crank bar extender 1043. In addition, the crank bar extender 1043 attaches to the crank bar 1124 with a crank bar attachment bolt 1045 that passes through one of several crank bar extension adjustment holes 1046 in the crank bar extender 1043 to screw into a threaded crank bar hole in the crank bar 1124. The combination of the plurality of crank bar extension adjustment holes 1046 in the crank bar extender 1043 and an adjustable position of the crank bar clamp 1044 along the length of the crank bar extender 1043 facilitates adjustment of the combined length of the crank bar 1124 and crank bar extender 1043. At an end of the crank bar extender 1043 furthest from a center of rotation of the front gear wheel 1120 is a crank bar extender axle socket 1042. A crank bar extender axle 1034 rotationally couples the crank bar extender axle socket 1042 with a crank bar extender axle extension tube 1072 attached to an end of the coupler bar 1070 distal from the swing arm 1060.

An elliptical foot platform 1080 is fastened to each coupler bar 1070 at a variable position between the crank bar end of the coupler bar 1070 where the coupler bar 1070 attaches to the crank bar extender 1043, and the swing arm end of the coupler bar 1070 where the coupler bar 1070 attaches to the swing arm 1060. A path traversed by the human operator's foot while pedaling the bicycle using the bicycle to elliptical conversion apparatus 1000 is dependent upon the position of the elliptical foot platform 1080 between the crank bar end and the swing arm end of the coupler bar 1070 as discussed previously. The elliptical foot platform 1080 is slideably and adjustably fastened to the coupler bar 1070 using a clamp 1082. In some embodiments, screws can be tightened in the clamp 1082 to tightly fasten the clamp to the coupler bar 1070. In other embodiments, a latch or buckle on a side of the clamp 1082 may be used to permit convenient adjustment of the position of the clamp 1082 along the length of the coupler bar 1070 by making it easy to loosen and tighten the clamp 1082 on the coupler bar 1070 without tools.

The elliptical foot platform 1080 is coupled to the clamp 1082 via a pair of platform mounting blocks 1086 that connect the elliptical foot platform 1080 to a platform axle 1084 that extends from a side of the clamp 1082. The elliptical foot platform 1080 is configured to rock forward and backward by the platform mounting blocks 1086 rotating about the platform axle 1084. A platform spring 1085 surrounding the platform axle 1084 and attached to a platform spring attachment rod 1083 disposed below the platform axle 1084 provides a centering force to maintain the elliptical foot platform 1080 in a level position generally parallel to the coupler bar 1070 while also allowing the elliptical foot platform 1080 to rock forward and backward according to a positioning of a human operator's foot as the human operator operates the drive train of the bicycle retrofitted with the conversion apparatus 1000.

The fifth embodiment of the conversion apparatus 1000 provides further adjustability features not included in the first through fourth embodiments. These include adjustability in a length of the triconnect frame structure 1092 between the seat post insert 1030 and the crossbar beam 1094, a length of the swing arm 1060 between the crossbar beam 1094 and the coupler bar 1070, a length of the coupler bar 1070 between the swing arm 1060 and the crank bar extender axle extension tube 1072, and a position of the elliptical foot platforms 1080 along the length of the coupler bar 1070. This is accomplished by an inner triconnect frame structure tube 1091 that slides into the triconnect frame structure 1092, which is in the form of an outer tube, and is secured in one of a range of possible positions by a fastener 1093 that holds the inner triconnect frame structure tube 1091 in place within the outer tube of the triconnect frame structure tube 1092. In addition, an inner swing arm tube 1061 that slides into the swing arm 1060, which is in the form of an outer tube, and is secured in one of a range of possible positions by a fastener 1062 that holds the inner swing arm tube 1061 in place within the outer tube of the swing arm 1060. Also, an inner coupler bar tube 1071 that slides into the coupler bar 1070, which is in the form of an outer tube, and is secured in one of a range of possible positions by a fastener (not shown) that holds the inner coupler bar tube 1071 in place within the outer tube of the coupler bar 1070. In some embodiments, the clamping pressure of the clamp 1082 on the coupler bar 1070 may provide enough force to securely maintain the position of the inner coupler bar tube 1071 within the outer tube of the coupler bar 1070. The fasteners mentioned above (i.e., fasteners 1062, 1093, and that not shown) may include a screw, a button, a pin, a bolt, or other fasteners as known in the art.

In various embodiments, the lengths of the coupler bar 1070 and the swing arm 1060 may be adjusted and fixed prior to an exercise session, and thereby be operationally fixable to a single length at a time. In other embodiments, lengths of the coupler bar 1070 and the swing arm 1060 may be variable during an exercise session according to a mechanical adjustment apparatus that adjusts a position of the inner coupler bar tube 1071 within the outer tube of the coupler bar 1070 and a position of the inner swing arm tube 1061 within the outer tube of the swing arm 1060. Such a mechanical adjustment apparatus may include a screw gear and a motor that operates the screw gear according to an operator's instructions, a hydraulic chamber that increases in length according to operation of a hydraulic pump controlled by an operator, or other mechanisms operable to adjust a length of a tube as known in the art.

Figure 12:
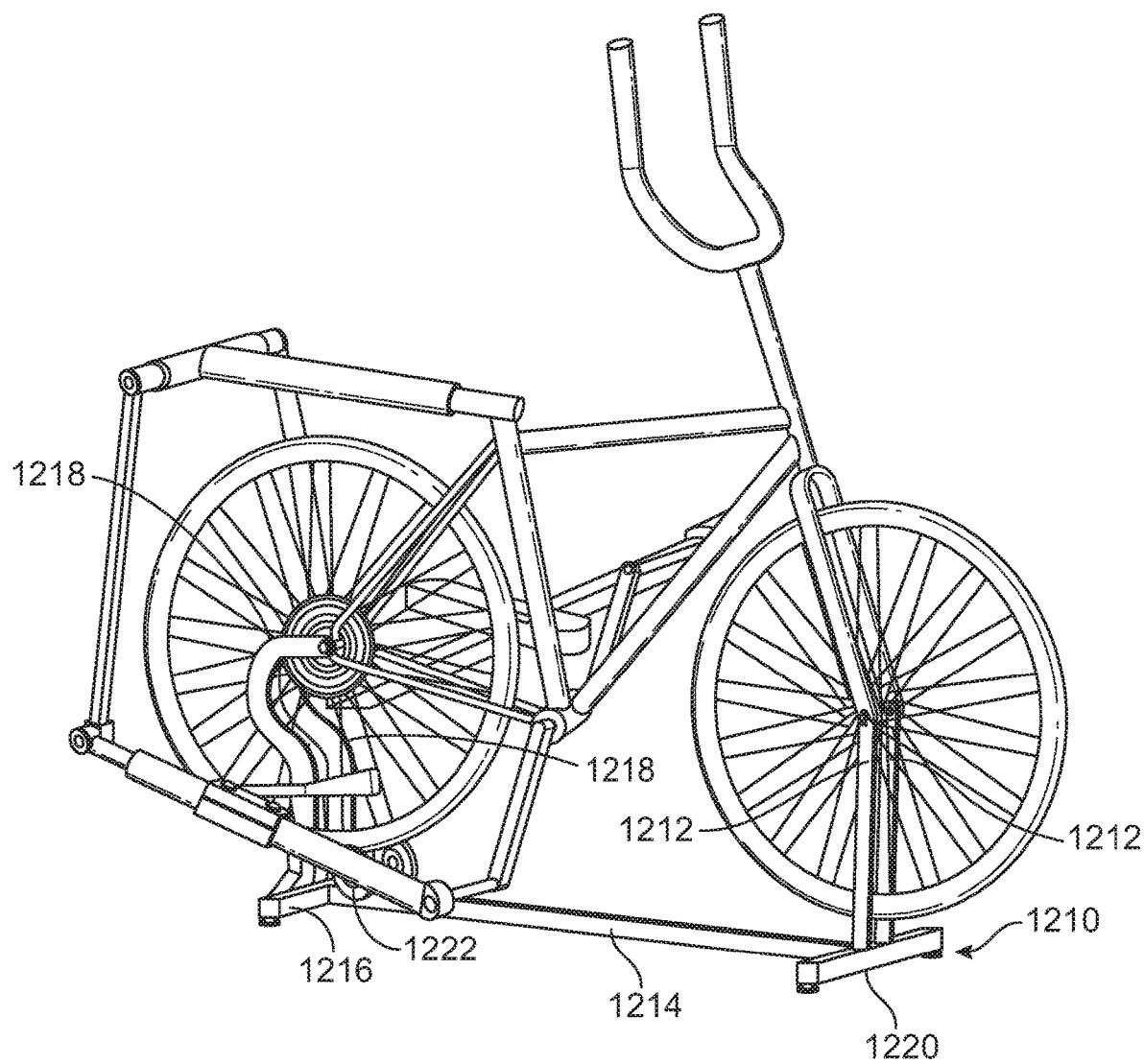
FIG. 12 illustrates the conversion apparatus of FIG. 10 configured in a stationary exercise configuration with a standard bicycle, according to an embodiment.

FIG. 12 illustrates the conversion apparatus of FIG. 10 configured in a stationary exercise configuration with a standard bicycle, according to an embodiment. The bicycle illustrated in FIG. 12 is similar to that illustrated in FIG. 11. The bicycle is configured in a stationary exercise bicycle configuration by being placed on a stationary exercise bicycle stand 1210. The stationary exercise bicycle stand 1210 has a front stabilizing beam 1220, a rear stabilizing beam 1216, and a central beam 1214 that connects the stabilizing beam 1220 and rear stabilizing beam 1216 together. The front wheel 1116 of the bicycle is held in place above the floor by a pair of vertical front risers 1212, while the rear wheel 1116 of the bicycle is held in place above the floor by a pair of vertical rear risers 1218. A pair of resistance wheels 1222 are disposed on the central beam 1214 to press against the rear wheel 1116 and provide rolling resistance against the rear wheel 1116. In various embodiments, the level of resistance provided by the resistance wheels 1222 may be adjustable in a manner as known in the art. In addition, the bicycle illustrated in FIG. 12 has upright handlebars in contrast to the handlebars 1118 illustrated in FIG. 11.

While the fifth embodiment of the bicycle to elliptical conversion apparatus 1000 is described as converting the standard bicycle to an elliptical bicycle or exercise machine, this should not be construed as limiting, as in various embodiments, the bicycle to elliptical conversion apparatus 1000 may convert the standard bicycle into a different exercise machine. For example, the bicycle to elliptical conversion apparatus 1000 may convert the bicycle to a rowing machine by attaching handles to the coupler bars 1070 at or near the swing arm end of the coupler bars 1070, or to the swing arms 1060 at or near the end that couples with the coupler bars 1070. Although the handles are not shown in the drawings attached to the coupler bars 1070 or to the swing arms 1060 as described, in various embodiments the handles may be similar to handles shown on handlebars in FIGS. 1, 4, 8, 9, 11, and 12, or on upright handles 846 shown in FIG. 8, and one of ordinary skill in the art would understand how to attach similar handles to the coupler bars 1070 or to the swing arms 1060. The handles may be attached using a clamp similar to clamp 1082 as illustrated and described herein. In these rowing machine embodiments, the human operator may be seated behind the bicycle retrofitted with the conversion apparatus 1000 (e.g., to the rear of the embodiment illustrated in FIG. 12), facing the bicycle and conversion apparatus 1000, to operate the drive mechanism of the combined bicycle and conversion apparatus 1000. A desired length of the adjustable coupler bars 1070 and the adjustable swing arms 1060 for optimal use in an application of the conversion apparatus 1000 as a rowing machine could be determined by one of ordinary skill in the art without undue experimentation.

Figure 13:
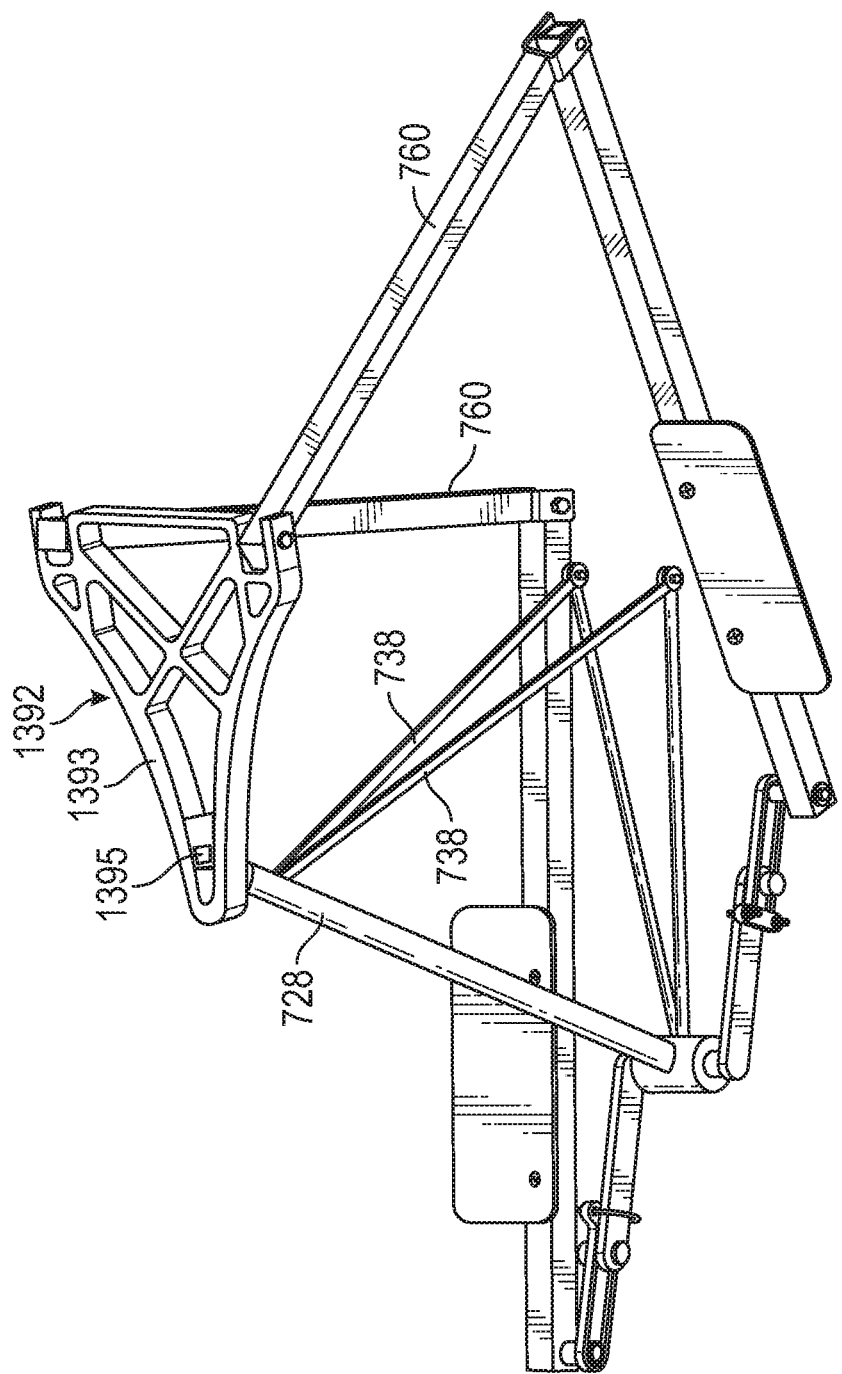
FIG. 13 illustrates a perspective view of a sixth embodiment of the conversion kit, according to an embodiment.

FIG. 13 illustrates a perspective view of a sixth embodiment of the conversion kit, according to an embodiment. The sixth embodiment illustrated in FIG. 13 is similar to the third embodiment of the conversion apparatus 700 illustrated in FIG. 7 with the following differences. A triconnect frame structure 1392 includes rail mount portions 1393 on a front region thereof that mount into rail clamps of a standard bicycle seat rail mount 1395. The rail mount portions are at a same level as the rest of the triconnect frame structure 1392. The triconnect frame structure 1392 facilitates the sixth embodiment of the conversion apparatus to be mounted on a standard bicycle by removing the bicycle seat from the standard bicycle seat rail mount 1395, and clamping the rail mount portions 1393 of the triconnect frame structure 1392 into the existing bicycle seat rail mount 1395, rather than removing both the bicycle seat and standard bicycle seat rail mount 1395 on which the bicycle seat is mounted from the bicycle.

Figure 14:
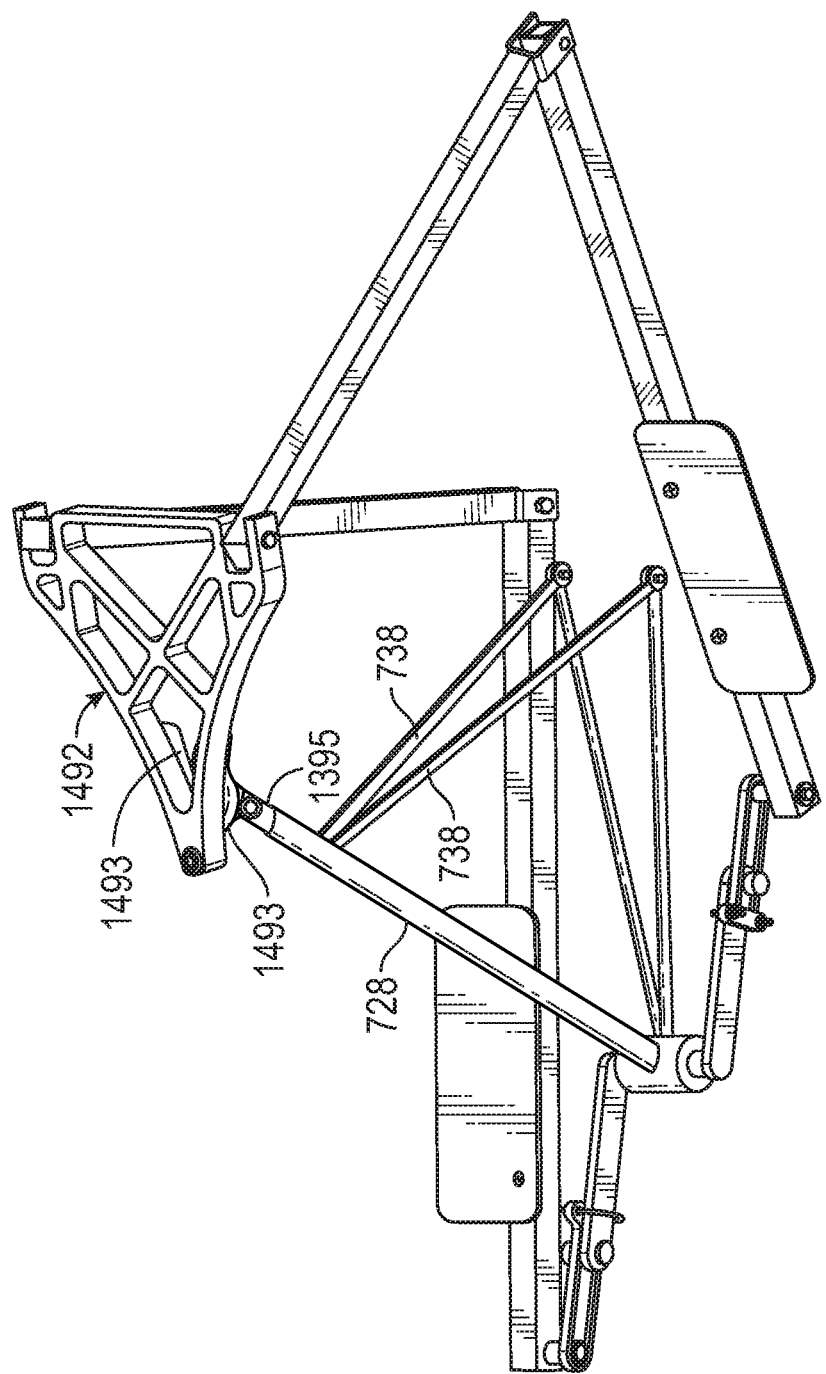
FIG. 14 illustrates a perspective view of a seventh embodiment of the conversion kit, according to an embodiment.

FIG. 14 illustrates a perspective view of a seventh embodiment of the conversion kit, according to an embodiment. The seventh embodiment illustrated in FIG. 14 is similar to the third embodiment of the conversion apparatus 700 illustrated in FIG. 7 with the following differences. A triconnect frame structure 1492 includes rail mount portions 1493 under a front region thereof that mount into rail clamps of a standard bicycle seat rail mount 1395. The rail mount portions are at a lower level than the rest of the triconnect frame structure 1492. The triconnect frame structure 1492 facilitates the seventh embodiment of the conversion apparatus to be mounted on a standard bicycle by removing the bicycle seat from the standard bicycle seat rail mount 1395, and clamping the rail mount portions 1493 of the triconnect frame structure 1492 into the existing bicycle seat rail mount 1395, rather than removing both the bicycle seat and standard bicycle seat rail mount 1395 on which the bicycle seat is mounted from the bicycle.

Figure 15:
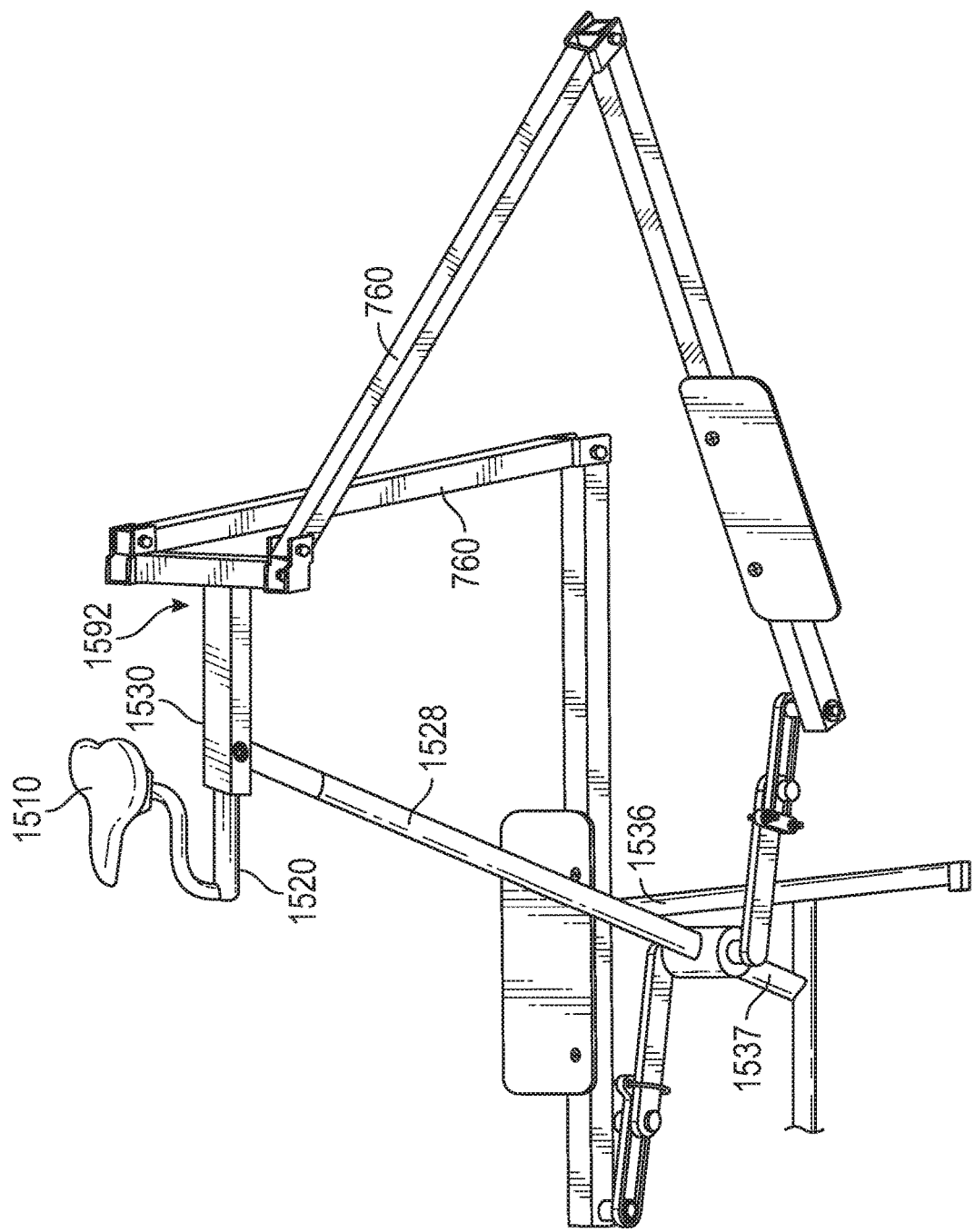
FIG. 15 illustrates a perspective view of an eighth embodiment of the conversion kit, according to an embodiment.

FIG. 15 illustrates a perspective view of an eighth embodiment of the conversion kit, according to an embodiment. The eighth embodiment of the conversion apparatus is installed on a stationary spin cycle. Rather than a rear wheel and a diamond bicycle frame, the stationary spin cycle includes an upright frame 1536 and base frame 1537 that hold the seat post 1528 and drive train elements in place in an upright position. A front region of a triconnect frame structure 1592 includes a seat mount 1530 that permits a seat 1510 mounted on an adjustable seat insert 1520 to be inserted therein and adjusted forward or backward. The seat 1510 and adjustable seat insert 1520 may be standard equipment on the illustrated spin cycle, and the seat mount 1530 may replace the seat mount that is provided as standard equipment for the illustrated spin cycle. The seat mount 1530 includes a post that mounts into an upright seat post 1528 of the spin cycle.

Various modifications may be made to the disclosed exemplary embodiments as understood by one of ordinary skill in the art and therefore the details of the disclosed embodiments should not be construed as limiting. For example, in various embodiments, the frame of the conversion apparatus may be mounted to different portions of the cycle frame than illustrated or discussed with reference to the exemplary embodiments, e.g., the rear triangle of the frame where a kickstand is typically mounted, or a bottom portion of the frame. Also, in some embodiments, the conversion apparatus may be mounted or welded onto the frame of a cycle, e.g., a bicycle or stationary exercise machine, for original manufacturing of an elliptical-type bicycle or elliptical-type stationary exercise machine.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

GLOSSARY OF REFERENCE NUMERALS 10 standard bicycle
12 bicycle frame
14 diamond frame
16 wheel
18 handlebar
20 front gear wheel
22 crank axle
24 crank bar
26 crank
28 seat post
30 seat post insert
34 pedal axle connector
36 diamond frame coupler bar
38 diamond frame angled bar
40 conversion apparatus
42 vertical bar
43 plate connector nut
44 inner clamp plate
45 plate connector bolt
46 outer clamp plate
48 plate connector link
50 arm joint axle
52 joint axle insert
53 joint axle washer
54 joint axle socket
56 joint axle bolt
60 swing arm
64 lower joint aperture
70 coupler bar
71 foot platform sockets
72 lower joint socket
73 foot platform bolt
74 lower joint bolt
75 foot platform washer
76 lower joint washer
77 foot platform nut
78 lower joint nut
80 foot platform
82 front foot platform bracket
84 rear foot platform bracket
86 foot platform front guard
88 foot platform rear guard
92 crossbar beam
94 crossbar joint connection
98 extension member
110 standard bicycle
140 conversion apparatus
700 conversion apparatus
722 crank axle
724 crank bar
728 seat post
730 seat post insert
736 diamond frame coupler bar
738 diamond frame angled bar
742 crank bar extender axle nut
743 threaded crank bar hole
744 crank bar extender U-bolt nuts
745 crank bar attachment bolt
746 crank bar extender U-bolt
750 arm joint aperture
752 joint axle bolt
753 joint axle washer
756 joint axle nut
760 swing arm
764 lower joint aperture
770 coupler bar
771 crank bar extender axle extension tube
772 crank bar extender
773 crank bar extender axle bolt
774 lower joint bolt
775 crank bar extender axle washer
776 lower joint washer
778 lower joint nut
780 elliptical foot platform
792 triconnect frame structure
800 conversion apparatus
812 bicycle frame
816 wheel
818 handlebars
822 crank axle
823 bicycle pedals
824 crank bar
828 seat post
830 detachable seat post attachment device
831 bicycle seat
832 seat post tube
836 diamond frame coupler bar
838 diamond frame angled bar
846 upright handles
850 arm joint aperture
860 swing arm
870 coupler bar
880 elliptical foot platform
882 pedal clamp
884 quick release levers
892 triconnect frame structure
1000 conversion apparatus
1030 seat post insert
1031 seat post insert expansion nut
1034 crank bar extender axle bolt
1042 crank bar extender axle socket
1043 crank bar extender
1044 crank bar clamp
1045 crank bar attachment bolt
1046 crank bar extension adjustment hole
1052 joint axle bolt
1054 arm joint aperture
1060 swing arm
1061 inner swing arm tube
1062 fastener
1063 lower arm end
1064 lower joint aperture
1070 coupler bar
1071 inner coupler bar tube
1072 crank bar extender axle extension tube
1074 lower joint bolt
1080 elliptical foot platform
1082 clamp
1083 platform spring attachment rod
1084 platform axle
1085 platform spring 1086 platform mounting block
1091 inner triconnect frame structure tube
1092 triconnect frame structure
1093 fastener
1094 crossbar beam
1100 standard bicycle
1112 bicycle frame
1116 wheels
1118 handlebars
1120 front gear wheel
1124 crank bar
1128 seat post
1136 diamond frame coupler bar
1138 diamond frame angled bar
1210 stationary exercise bicycle stand
1212 vertical front risers
1214 central beam
1216 rear stabilizing beam
1218 vertical rear risers
1220 front stabilizing beam
1222 resistance wheels
1392 triconnect frame structure
1393 rail mount portion
1395 bicycle seat rail mount
1492 triconnect frame structure
1493 rail mount portion
1510 seat
1520 adjustable seat insert
1528 seat post
1530 seat mount
1536 upright frame
1537 base frame
1592 triconnect frame structure

What is claimed is:

1. An apparatus for converting a cycle-type exercise machine into another type of exercise machine, the apparatus comprising:

a stationary frame structure that attaches to a frame of the cycle-type exercise machine; a pair of swing arms having a proximal end and a distal end, the proximal end of each of the pair of swing arms being pivotally coupled with the stationary frame structure to swing relative to the stationary frame structure; and a pair of coupler bars having a first end and a second end, the first end of each of the pair of coupler bars being pivotally coupled with the distal end of a respective one of the pair of swing arms, the second end of each of the pair of coupler bars being configured to rotationally attach to a crank bar of the cycle-type exercise machine, and each of the pair of coupler bars includes a bolt that rotationally attaches the coupler bar to the crank bar of the cycle-type machine.

2. The apparatus of claim 1, further comprising a pair of handles, each of the pair of handles coupled with one of the pair of coupler bars.

3. The apparatus of claim 1, further comprising a pair of handles, each of the pair of handles coupled with one of the pair of swing arms.

4. The apparatus of claim 1, wherein each of the pair of coupler bars includes a pedal clamp disposed at the second end that clamps onto a pedal attached to the crank bar of the cycle-type machine.

5. The apparatus of claim 1, wherein each of the pair of coupler bars includes an extension arm that affixes to the crank bar of the cycle-type machine and extends a length of the crank bar, the coupler bar being rotationally attached to the extension arm.

6. The apparatus of claim 1, wherein each of the pair of coupler bars is extendable to a variable range of lengths.

7. The apparatus of claim 1, wherein each of the pair of swing arms is extendable to a variable range of lengths.

* * * * *